United States Patent

Aoki

[11] Patent Number: 6,041,193
[45] Date of Patent: Mar. 21, 2000

[54] REAL-IMAGE ZOOM FINDER WITH ROTATIONALLY ASYMMETRIC SURFACE

[75] Inventor: Norihiko Aoki, Iino-machi, Japan

[73] Assignee: Olympus Optical Co., Ltd., Tokyo, Japan

[21] Appl. No.: 09/118,383

[22] Filed: Jul. 17, 1998

[30] Foreign Application Priority Data

Jul. 18, 1997 [JP] Japan .................................. 9-194254

[51] Int. Cl.[7] .................................................. G03B 17/10
[52] U.S. Cl. ........................ 396/379; 396/382; 359/678; 359/689
[58] Field of Search .................................. 396/373, 378, 396/379, 382, 385, 386; 359/431, 432, 433, 676, 678, 689, 720

[56] References Cited

U.S. PATENT DOCUMENTS

| 3,810,221 | 5/1974 | Plummer . |
| 3,836,931 | 9/1974 | Plummer . |
| 5,917,656 | 6/1999 | Hayakawa et al. .................. 359/637 |
| 5,920,428 | 7/1999 | Kim ................................. 359/689 X |
| 5,963,376 | 10/1999 | Togino .............................. 396/379 X |

FOREIGN PATENT DOCUMENTS

| 722106A2 | 7/1996 | European Pat. Off. . |
| 8-248481 | 9/1996 | Japan . |
| 8-292368 | 11/1996 | Japan . |
| 8-292371 | 11/1996 | Japan . |
| 8-292372 | 11/1996 | Japan . |

*Primary Examiner*—Howard B. Blankenship
*Attorney, Agent, or Firm*—Pillsbury Madison & Sutro LLP

[57] ABSTRACT

A high-performance real-image finder with a zoom objective optical system wherein a power is given to a reflecting surface of an image-inverting optical system to reduce the size in the direction of the thickness, and at the same time, a rotationally asymmetric surface is used in the image-inverting optical system to correct rotationally asymmetric decentration aberrations. The zoom objective optical system Ob has a first lens unit G1 of negative power, a second lens unit G2 of positive power, and a third lens unit G3 of positive or negative power. The real-image finder further includes an image-inverting optical system PP for erecting an intermediate image formed by the objective optical system Ob, and an ocular optical system Oc having a positive refracting power. At least one of reflecting surfaces $S_8$ and $S_9$ of the image-inverting optical system PP is a curved reflecting mirror having an optical power and has a rotationally asymmetric surface configuration that corrects decentration aberrations produced by the curved reflecting mirror.

23 Claims, 13 Drawing Sheets

REAL-IMAGE ZOOM FINDER WITH ROTATIONALLY ASYMMETRIC SURFACE

BACKGROUND OF THE INVENTION

The present invention relates to real-image finders and, more particularly, to a real-image finder with an image-inverting optical system that is suitable for use in still cameras, still video systems, etc. in which a photographic optical system and a finder optical system are provided separately from each other.

In lens-shutter cameras and so forth, a photographic optical system and a finder optical system are provided separately from each other. Finder optical systems of this type may be roughly divided into virtual-image finders and real-image finders. Virtual-image finders have the disadvantage due to the arrangement thereof that the diameter of the front lens is unfavorably large and the visibility of the view frame is not good. Accordingly, virtual-image finders involve a serious problem in achieving compact and high-performance finder optical systems. In contrast, real-image finders have an arrangement in which a view frame is placed in the vicinity of an intermediate image plane of an objective optical system, and the view frame is observed through an ocular optical system. Therefore, the boundaries of the view frame can be seen clearly. Moreover, because the position of the entrance pupil is close to the object side thereof, the objective optical system can be reduced in size in the diametric direction. Therefore, most of the recent compact and high-performance lens-shutter cameras employ real-image finders.

Thus, real-image finders can be reduced in size in comparison to virtual-image finders. That is, the diameter of the entrance-side lens can be made smaller than in the case of virtual-image finders. However, a real-image finder consists of an objective optical system, an image-inverting optical system, and an ocular optical system. Therefore, the overall length is unfavorably long. When such a real-image finder is mounted in a camera, the thickness of the camera increases disadvantageously. Therefore, attempts to achieve a compact real-image finder are generally made by devising methods to effectively fold the image-inverting optical system, which includes a prism and a mirror.

Recent lens-shutter cameras equipped with zoom lenses are required to have both a high zoom ratio and a compact and high-performance structure. Many of these lens-shutter cameras employ a collapsible mount type photographic optical system to reduce the overall size of the camera when not used. That is, when the camera is not used, the taking lens is withdrawn into the camera body; when the user is going to photograph a picture, the taking lens is extended to an operative position. In the finder optical system, which is provided separately from the photographic optical system, the amount of change in the field angle required increases as the zoom ratio of the taking lens becomes higher. In general, however, the finder optical system itself is not allowed to project from the camera body. In addition, the camera body is becoming slimmer these days. Therefore, it is very difficult to achieve an even more compact structure and a higher zoom ratio at the same time in the present state of art. One of factors in preventing the real-image finder from becoming compact in the direction of the thickness is the power distribution in the objective optical system. In general, the real-image finder obtains an erect image by using an image-inverting optical system including a prism and a mirror. Therefore, it is necessary to ensure an optical path length sufficiently long to invert the image by the image-inverting optical system. Accordingly, the objective optical system generally adopts a retrofocus type power distribution in which the back focus is long relative to the focal length of the entire system. This type is unsuitable for reducing the overall length and increasing the zoom ratio. Accordingly, there have been made many propositions that a curved surface could be used to form a refracting surface of an image-inverting optical system using a prism to assign a part of the power of the objective optical system to the image-inverting optical system. In the present state of art, however, there is no solution to the problem of how to reduce the size of the objective optical system in the direction of the thickness and to increase the zoom ratio at the same time while ensuring a sufficiently long optical path length to effect image inversion in the image-inverting optical system.

Accordingly, there have recently been made some propositions that a curved surface be used to form not a refracting surface but a reflecting surface in an image-inverting optical system of a real-image finder. That is a reflecting surface of a prism or a mirror that constitutes the image-inverting optical system, could be curved thereby giving a power to the image-inverting optical system. Adopting such an arrangement makes it possible to minimize the back focus of the objective optical system while ensuring the optical path length required for the image inversion and hence possible to reduce the size of the objective optical system in the direction of the thickness. However, a reflecting surface of the image-inverting optical system is generally decentered with respect to the optical axis. If a power is given to the decentered reflecting surface, aberrations due to decentration that are rotationally asymmetric even on the optical axis are produced. The rotationally asymmetric decentration aberrations are basically impossible to correct by a rotationally symmetric surface.

U.S. Pat. Nos. 3,810,221 and 3,836,931 both disclose an example in which a rotationally symmetric aspherical mirror and a lens system having a surface which has only one plane of symmetry are used to form a finder optical system of a reflex camera. In this example, however, the surface having only one plane of symmetry is utilized for the purpose of correcting the tilt of a virtual image for observation. Furthermore, in this example, the taking lens of the camera and the finder optical system are not separate from each other.

Japanese Patent Application Unexamined Publication Number [hereinafter referred to as "JP(A)"] 8-248481 uses a rotationally symmetric curved surface as a reflecting surface of a prism that forms a real-image zoom finder of a lens-shutter camera. It is stated in the publication that an aspherical surface or a toric surface is applicable to the curved surface. However, the aspherical surface disclosed in the specification of the publication is rotationally symmetric. The toric surface is also symmetric with respect to two coordinate axes. Therefore, correction for skew rays cannot satisfactorily be performed. In either example, a curved surface is used as a reflecting surface of a prism. However, the prism does not have an image-inverting action but merely serves to ensure the required optical path length.

EP0722106A2 discloses the use of a rotationally asymmetric curved surface as a reflecting surface of a prism in a real-image finder of a fixed focal length lens-shutter camera in addition to the subject matter of the above-described JP(A) 8-248481. As stated in the specification of the publication, the prism serves the function of an objective lens and does not have an image-inverting action.

JP(A) 8-292368, 8-292371 and 8-292372 perform image inversion in fixed focal length and zoom image pickup apparatuses by using a prism optical system having a rotationally asymmetric surface, but show no example in which the disclosed arrangement is applied to a finder optical system. These conventional techniques have no intention of applying the above-described arrangement to a finder optical system.

SUMMARY OF THE INVENTION

In view of the above-described circumstances of the prior art, an object of the present invention is to provide a real-image finder in which an intermediate image formed by a zoom objective optical system is erected by an image-inverting optical system, and the erect image is observed through an ocular optical system, particularly a high-performance real-image finder in which a power is given to a reflecting surface of the image-inverting optical system to achieve a reduction in the size in the direction of the thickness, and at the same time, a rotationally asymmetric surface is used in the image-inverting optical system to correct rotationally asymmetric decentration aberrations.

To attain the above-described object, the present invention provides a real-image finder including, in order from the object side thereof, an objective optical system having a positive refracting power, an image-inverting optical system for erecting an intermediate image formed by the objective optical system, and an ocular optical system having a positive refracting power. The objective optical system includes, in order from the object side thereof, a first lens unit having a negative refracting power, a second lens unit having a positive refracting power, and a third lens unit having a positive or negative refracting power. When zooming from a wide-angle end to a telephoto end is performed, the spacing between each pair of lens units among the first to third lens units is changed. At least one of reflecting surfaces of the image-inverting optical system is arranged in the form of a curved reflecting mirror having an optical power and has a rotationally asymmetric surface configuration that corrects decentration aberrations produced by the curved reflecting mirror.

First of all, a coordinate system used in the following description of the present invention will be explained.

It is assumed that a light ray passing through the center of an object point and passing through the center of a stop or aperture of the objective optical system to reach the center of an intermediate image plane and further passing through the ocular optical system to enter the center of a pupil is defined as an axial principal ray. It is further assumed that an optical axis defined by a straight line along which the axial principal ray travels until it intersects a first surface of the optical system is defined as a Z-axis, and that an axis perpendicularly intersecting the Z-axis in the decentration plane of each decentered surface constituting the finder optical system is defined as a Y-axis, and further that an axis perpendicularly intersecting the optical axis and also perpendicularly intersecting the Y-axis is defined as an X-axis. Ray tracing will be described by forward ray tracing in which light rays are traced from the object toward the image plane.

Next, the rotationally asymmetric surface used in the present invention will be described.

In general, a spherical lens system comprising only a spherical lens is arranged such that aberrations produced by spherical surfaces, such as spherical aberration, coma and curvature of field, are corrected with some surfaces by canceling the aberrations with each other, thereby reducing aberrations as a whole. On the other hand, aspherical surfaces and the like are used to correct aberrations favorably with a minimal number of surfaces. The reason for this is to reduce various aberrations that would be produced by spherical surfaces.

When a rotationally symmetric optical system is decentered, rotationally asymmetric aberrations occur, and it is basically impossible to correct these aberrations only by a rotationally symmetric optical system. Rotationally asymmetric aberrations due to decentration include distortion, curvature of field, and astigmatic and comatic aberrations, which occur even on the axis. FIG. 11 shows curvature of field produced by a decentered concave mirror M. FIG. 12 shows astigmatism produced by a decentered concave mirror M. FIG. 13 shows axial comatic aberration produced by a decentered concave mirror M. Accordingly to the present invention, a rotationally asymmetric surface is placed in the optical system to correct such rotationally asymmetric aberrations due to decentration.

Rotationally asymmetric aberrations produced by a decentered concave mirror include rotationally asymmetric curvature of field. For example, when light rays from an infinitely distant object point are incident on a decentered concave mirror, the rays are reflected by the concave mirror to form an image. In this case, the back focal length from that portion of the concave mirror on which the rays strike to the image surface is a half the curvature of the portion on which the light rays strike in a case where the medium on the image side is air. Consequently, an image surface tilted with respect to the axial principal ray is formed as shown in FIG. 11. It has heretofore been impossible to correct such rotationally asymmetric curvature of field by a rotationally symmetric optical system. The tilted curvature of field can be corrected by forming the concave mirror M from a rotationally asymmetric surface, and, in this example, arranging it such that the curvature is made strong (refracting power is increased) in the positive Y-axis direction (the upward direction in the figure), whereas the curvature is made weak (refracting power is reduced) in the negative Y-axis direction. It is also possible to obtain a flat image surface with a minimal number of constituent surfaces by placing a rotationally asymmetric surface having the same effect as that of the above-described arrangement in the optical system separately from the concave mirror M.

Next, rotationally asymmetric astigmatism will be explained. A decentered concave mirror M produces astigmatism even for axial rays, as shown in FIG. 12, as in the case of the above. The astigmatism can be corrected by appropriately changing the curvatures in the X- and Y-axis directions of the rotationally asymmetric surface as explained above.

Rotationally asymmetric coma will be explained below. A decentered concave mirror M produces coma even for axial rays, as shown in FIG. 13, as in the case of the above. The coma can be corrected by changing the tilt of the rotationally asymmetric surface as the distance from the origin of the X-axis increases, and further appropriately changing the tilt of the surface according to the sign (positive or negative) of the Y-axis.

The real-image finder according to the present invention, to which the above-described rotationally asymmetric curved surface is applied, will be described below in detail.

In the real-image finder, the optical path is folded by the image-inverting optical system. Therefore, the objective optical system has a greater influence than the ocular optical system on the determination of the size of the optical system in the direction of the thickness (hereinafter referred to as "Z-axis direction"). Accordingly, the key to reducing the size in the Z-axis direction, which is one of the problems to be solved by the present invention, is how to achieve a reduction in the size of the objective optical system and image-inverting optical system in the Z-axis direction. Consequently, a feature of the present invention resides in that the image-inverting optical system has a Porro prism. The use of a Porro prism makes it possible to fold the optical path immediately behind the objective optical system (on the intermediate image plane side), and enables the image-inverting optical system to be effectively reduced in size in the Z-axis direction in comparison to the use of a roof prism, a roof mirror, a pentagonal prism or the like.

Let us consider the reduction of the size in the Z-axis direction of the image-inverting optical system, inclusive of the objective optical system. As has been stated above, the image-inverting optical system is essential for the real-image finder because of the need to effect image inversion. For this reason, the objective optical system generally adopts the retrofocus type power distribution, in which the back focus is long relative to the focal length of the entire system, to ensure an optical path length sufficient to effect image inversion in the image-inverting optical system while satisfying the demand for a field angle approximately equal to that of the photographic optical system. However, as a result of adopting the retrofocus type power distribution, the overall length of the objective optical system becomes long relative to the focal length thereof. When attention is focused only on the objective optical system, a reduction in the size of the optical system in the Z-axis direction can be attained only by increasing the power of each lens. At the same time, the retrofocus type power distribution makes it difficult to achieve a higher zoom ratio.

To overcome the difficulties, many arrangements have been devised in which a power is given to a surface of an image-inverting member used in the image-inverting optical system to assign a part of the power of the objective optical system to the image-inverting member. However, the image-inverting optical system has reflecting surfaces decentered with respect to the above-described axial principal ray (the optical axis in the case of a rotationally symmetric optical system) to effect image inversion as represented by a Porro prism. Therefore, if a power is given to such a decentered reflecting surface, decentration aberrations occur as stated above. It is basically impossible to correct the decentration aberrations by a rotationally symmetric curved surface. For this reason, the common practice is to adopt an arrangement in which a power is given to a refracting surface that is not decentered with respect to the axial principal ray with the decentered reflecting surfaces left as being plane surfaces. In this case, however, if a power is given to the entrance-side refracting surface of the image-inverting member, the power distribution in the objective optical system itself cannot be changed to a considerable extent because the refracting surface is the surface closest to the objective optical system. When a power is given to the exit-side refracting surface, because the refracting surface is in close proximity to the intermediate image plane, it can serve only the function of a field lens. Accordingly, this also makes only a minor contribution to the achievement of a reduction in the size in the Z-axis direction.

The arrangement of the present invention is characterized in that a power is given to at least one decentered reflecting surface of a Porro prism as an image-inverting member, which is decentered with respect to the axial principal ray, and at least one surface of the Porro prism is a rotationally asymmetric surface, as stated above. The fact that a power is given to a decentered reflecting surface means that a power is provided inside the Porro prism serving as an image-inverting member. Thus, a part of the function of the objective optical system, which forms an intermediate image of an object while inverting the image, can be assigned to the inside of the image-inverting optical system. Therefore, it is possible to obtain an advantageous effect equivalent to shortening the back focus of the objective optical system despite the fact that it adopts the same retrofocus type power distribution and the focal length of the entire optical system remains unchanged. Consequently, it is possible to reduce the overall length in the Z-axis direction. With the above-described arrangement, however, rotationally asymmetric aberrations due to decentration occur as stated above, and these aberrations cannot be corrected by only a rotationally symmetric surface. Therefore, a rotationally asymmetric surface is used as at least one surface of the Porro prism to favorably correct the rotationally asymmetric decentration aberrations due to the power given to at least one decentered reflecting surface.

Giving a power to at least one decentered reflecting surface of the image-inverting optical system also makes it possible to reduce the power of another rotationally symmetric surface constituting the real-image finder and to minimize the number of rotationally symmetric lens elements used. This is favorable for achieving a compact finder optical system. Thus, it is possible to reduce the size of the real-image finder and to improve the performance thereof at the same time.

It is preferable that the Porro prism used in the present invention should consist of one or a plurality of blocks. When the Porro prism consists of a single block, it is unnecessary to perform adjustment during assembly, provided that the required decentration accuracy and surface accuracy are obtained for each surface at the time of formation of parts. Therefore, the production cost can be reduced to a considerable extent. When the Porro prism consists of two, three or four blocks, it is possible to place an intermediate image of an object inside the Porro prism. Accordingly, the freedom for the finder magnification increases, and the degree of freedom of positioning a view frame for indicating information within the finder also increases.

It is desirable that the rotationally asymmetric surface used in the real-image finder according to the present invention should be decentered with respect to the axial principal ray. In the present invention, a power is given to a reflecting surface decentered with respect to the axial principal ray. Consequently, rotationally asymmetric decentration aberrations are produced by the decentered reflecting surface. The rotationally asymmetric decentration aberrations can be corrected efficiently by introducing a rotationally asymmetric surface decentered with respect to the axial principal ray. If the rotationally asymmetric surface introduced to correct the rotationally asymmetric decentration aberrations is not decentered with respect to the axial principal ray, the degree of rotational asymmetry of the rotationally asymmetric surface becomes excessively strong, and the sensitivity to aberrations also becomes high. Therefore, the production becomes difficult.

A surface decentered with respect to the axial principal ray and provided with a power per se may be formed from a rotationally asymmetric surface. By doing so, it becomes possible to form a surface that produces minimum rotationally asymmetric decentration aberrations despite the fact that the surface is decentered and has a power.

It is desirable that the rotationally asymmetric surface used in the real-image finder according to the present invention should have no axis of rotational symmetry in nor out of the surface. In the case of a rotationally asymmetric surface having axes of rotational symmetry in and out of the surface, e.g. an off-axis toric surface or an off-axis paraboloid, a rotationally symmetric component remains. Therefore, it is impossible to satisfactorily correct rotationally asymmetric decentration aberrations in contrast to aberration correction performed by using a rotationally asymmetric surface as introduced in the present invention.

Let us consider a rotationally asymmetric surface (hereinafter referred to as a "TFC surface") defined by the following equation, by way of example.

$$Z = C_2 + C_3 y + C_4 x + C_5 y^2 + C_6 yx + C_7 x^2 + C_8 y^3 + \quad \text{(a)}$$
$$C_9 y^2 x + C_{10} yx^2 + C_{11} x^3 + C_{12} y^4 + C_{13} y^3 x + C_{14} y^2 x^2 +$$
$$C_{15} yx^3 + C_{16} x^4 + C_{17} y^5 + C_{18} y^4 x + C_{19} y^3 x^2 + C_{20} y^2 x^3 +$$
$$C_{21} yx^4 + C_{22} x^5 + C_{23} y^6 + C_{24} y^5 x + C_{25} y^4 x^2 + C_{26} y^3 x^3 +$$
$$C_{27} y^2 x^4 + C_{28} yx^5 + C_{29} x^6 + C_{30} y^7 + C_{31} y^6 x + C_{32} y^5 x^2 +$$
$$C_{33} y^4 x^3 + C_{34} y^3 x^4 + C_{35} y^2 x^5 + C_{36} yx^6 + C_{37} x^7$$

In general, the above-described TFC surface does not have planes of symmetry in both the XZ- and YZ-planes. However, a free-form surface having only one plane of symmetry parallel to the YZ-plane is obtained by making all terms with odd-numbered powers of x zero. For example, in the above defining equation (a), the coefficients of the terms $C_4$, $C_6$, $C_9$, $C_{11}$, $C_{13}$, $C_{15}$, $C_{18}$, $C_{20}$, $C_{22}$, $C_{24}$, $C_{26}$, $C_{28}$, $C_{31}$, $C_{33}$, $C_{35}$, $C_{37}$, . . . are set equal to zero. By doing so, it is possible to obtain a free-form surface having only one plane of symmetry parallel to the YZ-plane.

A TFC surface having only one plane of symmetry parallel to the XZ-plane is obtained by making all terms with odd-numbered powers of y zero. For example, in the above defining equation (a), the coefficients of the terms $C_3$, $C_6$, $C_8$, $C_{10}$, $C_{13}$, $C_{15}$, $C_{17}$, $C_{19}$, $C_{21}$, $C_{24}$, $C_{26}$, $C_{28}$, $C_{30}$, $C_{32}$, $C_{34}$, $C_{36}$, . . . are set equal to zero. By doing so, it is possible to obtain a TFC surface having only one plane of symmetry parallel to the XZ-plane. The use of a TFC surface having such a plane of symmetry makes it possible to improve the productivity.

It is more desirable that the TFC surface should have no plane of symmetry. If the TFC surface has no plane of symmetry, the degree of freedom increases correspondingly. This is favorable for aberration correction.

It should be noted that the above defining equation (a) is shown as merely an example, and that the feature of the present invention resides in that rotationally asymmetric aberrations due decentration are corrected by a rotationally asymmetric surface. Therefore, the same advantageous effect can be obtained for any other defining equation that expresses a rotationally asymmetric surface.

TFC surfaces may also be defined by Zernike polynomials. That is, the configuration of a TFC surface may be defined by the following equation (b). The Z-axis of the defining equation (b) is the axis of Zernike polynomial. A rotationally asymmetric surface is defined by polar coordinates of the height of the Z-axis with respect to the XY-plane. In the equation (b), A is the distance from the Z-axis in the XY-plane, and R is the azimuth angle about the Z-axis, which is expressed by the angle of rotation measured from the Z-axis.

$$X = R \times \cos(A) \quad \text{(b)}$$
$$Y = R \times \sin(A)$$
$$Z = D_2 + D_3 R\cos(A) + D_4 R\sin(A) + D_5 R^2 \cos(2A) + D_6(R^2 - 1) +$$
$$D_7 R^2 \sin(2A) + D_8 R^3 \cos(3A) + D_9(3R^3 - 2R)\cos(A) +$$
$$D_{10}(3R^3 - 2R)\sin(A) + D_{11} R^3 \sin(3A) + D_{12} R^4 \cos(4A) +$$
$$D_{13}(4R^4 - 3R^2)\cos(2A) + D_{14}(6R^4 - 6R^2 + 1) +$$
$$D_{15}(4R^4 - 3R^2)\sin(2A) + D_{16} R^4 \sin(4A) + D_{17} R^5 \cos(5A) +$$
$$D_{18}(5R^5 - 4R^3)\cos(3A) + D_{19}(10R^5 - 12R^3 + 3R)\cos(A) +$$
$$D_{20}(10R^5 - 12R^3 + 3R)\sin(A) + D_{21}(5R^5 - 4R^3)\sin(3A) +$$
$$D_{22} R^5 \sin(5A) + D_{23} R^6 \cos(6A) + D_{24}(6R^6 - 5R^4)\cos(4A) +$$
$$D_{25}(15R^6 - 20R^4 + 6R^2)\cos(2A) +$$
$$D_{26}(20R^6 - 30R^4 + 12R^2 - 1) +$$
$$D_{27}(15R^6 - 20R^4 + 6R^2)\sin(2A) +$$
$$D_{28}(6R^6 - 5R^4)\sin(4A) + D_{29} R^6 \sin(6A)$$

In the above equation, to design an optical system symmetric in the X-axis direction, $D_4$, $D_5$, $D_6$, $D_{10}$, $D_{11}$, $D_{12}$, $D_{13}$, $D_{14}$, $D_{20}$, $D_{21}$, $D_{22}$, . . . should be used.

Other examples of surfaces usable in the present invention are expressed by the following defining equation:

$$Z = \Sigma_n \Sigma_m C_{nm} x^n y^{n-m}$$

where $\Sigma_n$ indicates that n of $\Sigma$ is from 0 to k, and $\Sigma_m$ indicates that m of $\Sigma$ is from 0 to n.

Assuming that k=7 (polynomial of degree 7), for example, a TFC surface is expressed by an expanded form of the above equation as follows:

$$Z = C_2 + C_3 Y + C_4 |X| + C_5 Y^2 + C_6 Y|X| + C_7 X^2 + C_8 Y^3 + C_9 Y^2 |X| + \quad \text{(c)}$$
$$C_{10} YX^2 + C_{11} |X^3| + C_{12} Y^4 + C_{13} Y^3 |X| + C_{14} Y^2 X^2 + C_{15} Y|X^3| +$$
$$C_{16} X^4 + C_{17} Y^5 + C_{18} Y^4 |X| + C_{19} Y^3 X^2 + C_{20} Y^2 |X^3| + C_{21} YX^4 +$$
$$C_{22} |X^5| + C_{23} Y^6 + C_{24} Y^5 |X| + C_{25} Y^4 X^2 + C_{26} Y^3 |X^3| +$$
$$C_{27} Y^2 X^4 + C_{28} Y|X^5| + C_{29} X^6 + C_{30} Y^7 + C_{31} Y^6 |X| + C_{32} Y^5 X^2 +$$
$$C_{33} Y^4 |X^3| + C_{34} Y^3 X^4 + C_{35} Y^2 |X^5| + C_{36} YX^6 + C_{37} |X^7|$$

It is preferable that the reflecting surface with a power and the rotationally asymmetric surface in the image-inverting optical system according to the present invention should be placed between the intermediate image plane and the objective optical system. If the reflecting surface with a power and the rotationally asymmetric surface are placed on a side of the intermediate image plane that is closer to the ocular optical system, the image-inverting optical system cannot satisfactorily share the power required for the objective optical system, and it becomes impossible to reduce the size of the objective optical system in the Z-axis direction. If the rotationally asymmetric surface and the reflecting surface with a power are not placed on a side of the intermediate image plane that is closer to the objective optical system, rotationally asymmetric decentration aberrations undesirably remain in the intermediate image and cannot be corrected.

The objective optical system used in the present invention may be either a zoom lens system or a single focal length lens system. Either lens system is applicable to the above-described arrangement.

The objective optical system in the present invention as arranged in the form of a zoom lens system will be described below.

In this case, the objective optical system according to the present invention has, in order from the object side thereof, a first lens unit having a negative refracting power, a second lens unit having a positive refracting power, and a third lens unit having a positive or negative refracting power. When zooming from the wide-angle end to the telephoto end is performed, the spacing between each pair of lens units among the first to third lens units is changed. At least one of reflecting surfaces of the image-inverting optical system is arranged in the form of a curved reflecting mirror having an optical power and has a rotationally asymmetric surface configuration that corrects decentration aberrations produced by the curved reflecting mirror.

In general, when an objective optical system of a real-image finder is provided with a zoom action, it is desirable to adopt a retrofocus type zoom system having at least two lens units, i.e. a negative and positive lens units, in order from the object side thereof to perform zooming and to provide a back focus necessary for placing an image-inverting optical system. In this case, however, when it is intended to raise the zoom ratio while maintaining the overall length of the objective optical system at a small value, it is difficult to achieve a zoom ratio higher than about 2 because of the limitations of the performance. In the present invention, the above-described arrangement of the objective optical system is adopted to attain a high zoom ratio of the order of from 3 to 4 and to ensure an optical path length sufficient to perform image inversion in the image-inverting optical system.

One type of objective optical system has three lens units, i.e. a negative, positive and negative lens units, and performs zooming by varying the spacing between each pair of lens units among the three. This type of optical system performs zooming mainly by moving the second lens unit having a positive refracting power and corrects a deviation of the intermediate image from the image plane by moving at least the first or third lens unit having a negative refracting power. In this type of optical system, particularly at the telephoto end, the first and second lens units come close to each other to provide a positive refracting power as a whole and form a telephoto type lens system in combination with the third lens unit, which has a positive and negative lens units. Thus, it is possible to reduce the overall size at the telephoto end despite a high zoom ratio. However, it is impossible to achieve a satisfactory reduction in the size in the Z-axis direction on account of the need for ensuring the back focus, as stated above.

Accordingly, as detailed above, a power is given to a reflecting surface of the image-inverting optical system to assign a part of the power of the objective optical system to the image-inverting optical system, thereby reducing the back focus while ensuring an optical path length sufficient to perform image inversion. By doing so, it becomes possible to reduce the overall length of the objective optical system. At the same time, a rotationally asymmetric surface is used as at least one surface of the image-inverting optical system, thereby making it possible to favorably correct the above-described rotationally asymmetric decentration aberrations, which occur as a result of giving a power to the decentered reflecting surface.

Furthermore, if a power is given to a decentered reflecting surface of the image-inverting optical system, it becomes possible to reduce the power of other rotationally symmetric surfaces constituting the real-image finder, and the amount of aberrations produced by the rotationally symmetric surfaces decreases. This is favorable for the reduction in the size of the finder optical system. Thus, the real-image finder is allowed to become compact in size and to have a higher zoom ratio and, at the same time, improved in performance.

When the objective optical system is of the type which has three lens units, i.e. a negative, positive and negative lens units, and performs zooming by varying the spacing between each pair of lens units among the three, it is preferable to satisfy either or both of the following conditions:

$$-2.0 < f_1/f_W < 0 \quad (1\text{-}1)$$

$$-2.0 < d_{z2}/d_{z1} < 0 \quad (1\text{-}2)$$

where $f_1$ is the focal length of the first lens unit of the objective optical system; $f_W$ is the focal length of the whole objective optical system (exclusive of a focal length corresponding to the power given to the image-inverting optical system) at the wide-angle end; $d_{z1}$ is the amount of change in the spacing between the first and second lens units during zooming from the wide-angle end to the telephoto end; and $d_{z2}$ is the amount of change in the spacing between the second and third lens units during zooming from the wide-angle end to the telephoto end.

The condition (1-1) is necessary to satisfy in order to ensure a sufficiently long back focus while minimizing a rotationally symmetric negative distortion occurring markedly at the wide-angle end of the objective optical system. If $f_1/f_W$ is not larger than the lower limit of the condition (1-1), i.e. −2.0, the required back focus can be obtained, but the negative distortion becomes excessively large and impossible to correct by another surface. If $f_1/f_W$ is not smaller than the upper limit, i.e. 0, the negative distortion itself decreases, but a sufficiently long back focus cannot be ensured. Consequently, it becomes difficult to effect image inversion even if a power is given to a reflecting surface of the image-inverting optical system. At the same time, it becomes difficult to reduce the size of the objective optical system.

The condition (1-2) is necessary to satisfy in order to achieve a reduction in the size of the objective optical system while ensuring the necessary zoom ratio. If $d_{z2}/d_{z1}$ is not larger than the lower limit of the condition (1-2), i.e. −2.0, the amount of movement of the first and second lens units relative to the third lens unit becomes excessively large. Consequently, it becomes impossible to achieve a reduction in the size of the objective optical system particularly at the telephoto end. If $d_{z2}/d_{z1}$ is not smaller than the upper limit, i.e. 0, it becomes difficult to obtain the necessary zoom ratio.

Another type of objective optical systems has three lens units, i.e. a negative, positive and positive lens units, and performs zooming by varying the spacing between each pair of lens units among the three. This type of optical system performs zooming and corrects a deviation of the intermediate image from the image plane mainly by moving the second and third lens units each having a positive refracting power. It is also possible to correct a deviation of the intermediate image from the image plane by moving the first lens unit having a negative refracting power.

This type of lens arrangement enables the necessary back focus to be readily ensured particularly at the wide-angle end. However, it is impossible to achieve a reduction in the size in the Z-axis direction as in the case of the type in which the third lens unit has a negative power.

Accordingly, as detailed above, a power is given to a reflecting surface of the image-inverting optical system to assign a part of the power of the objective optical system to the image-inverting optical system, thereby reducing the back focus while ensuring an optical path length sufficient to perform image inversion. By doing so, it becomes possible to reduce the overall length of the objective optical system. At the same time, a rotationally asymmetric surface is used as at least one surface of the image-inverting optical system, thereby making it possible to favorably correct the above-described rotationally asymmetric decentration aberrations, which occur as a result of giving a power to the decentered reflecting surface.

In this case also, it is preferable to satisfy either or both of the following conditions:

$$-2.0 < f_1/f_W < 0 \quad (2\text{-}1)$$

$$-2.0 < d_{z2}/d_{z1} < 0 \quad (2\text{-}2)$$

where $f_1$ is the focal length of the first lens unit of the objective optical system; $f_W$ is the focal length of the whole objective optical system (exclusive of a focal length corresponding to the power given to the image-inverting optical system) at the wide-angle end; $d_{z1}$ is the amount of change in the spacing between the first and second lens units during zooming from the wide-angle end to the telephoto end; and $d_{z2}$ is the amount of change in the spacing between the second and third lens units during zooming from the wide-angle end to the telephoto end.

The condition (2-1) is necessary to satisfy in order to ensure a sufficiently long back focus while minimizing a rotationally symmetric negative distortion occurring markedly at the wide-angle end of the objective optical system. If $f_1/f_W$ is not larger than the lower limit of the condition (2-1), i.e. -2.0, the required back focus can be obtained, but the negative distortion becomes excessively large and impossible to correct by another surface. If $f_1/f_W$ is not smaller than the upper limit, i.e. 0, the negative distortion itself decreases, but a sufficiently long back focus cannot be ensured. Consequently, it becomes difficult to effect image inversion even if a power is given to a reflecting surface of the image-inverting optical system. At the same time, it becomes difficult to reduce the size of the objective optical system.

The condition (2-2) is necessary to satisfy in order to achieve a reduction in the size of the objective optical system while ensuring the necessary zoom ratio. If $d_{z2}/d_{z1}$ is not larger than the lower limit of the condition (2-2), i.e. -2.0, the amount of movement of the first and second lens units relative to the third lens unit becomes excessively large. Consequently, it becomes impossible to achieve a reduction in the size of the objective optical system particularly at the telephoto end. If $d_{z2}/d_{z1}$ is not smaller than the upper limit, i.e. 0, it becomes difficult to obtain the necessary zoom ratio.

Furthermore, if a power is given to a decentered reflecting surface of the image-inverting optical system, it becomes possible to reduce the power of other rotationally symmetric surfaces constituting the real-image finder, and the amount of aberrations produced by the rotationally symmetric surfaces decreases. This is favorable for the reduction in the size of the finder optical system. Thus, the real-image finder is allowed to become compact in size and to have a higher zoom ratio and, at the same time, improved in performance.

In any of the above-described cases, the present invention enables favorable aberration correction to be performed by using a rotationally symmetric aspherical surface as at least one surface in the optical system.

It is favorable from the viewpoint of cost to form each optical element from an organic material. In this case, it is preferable to use a material of low moisture absorption, such as amorphous polyolefin because such a material has a minimum change in performance with environmental conditions.

In the above-described zoom type optical system, a Porro prism can be used as an image-inverting optical member in the image-inverting optical system, and it is also possible to use as an image-inverting optical member a roof prism, a roof mirror, a pentagonal prism, a Pechan prism, a deviation prism, a right-angle prism, a wedge-shaped prism, a pentagonal roof prism, etc. In particular, when a prism is used as an image-inverting member, reflection is performed by a back-coated reflecting surface of the prism. Therefore, when the power to be obtained is the same, the curvature of the reflecting surface can be made gentler than in the case of reflection by a surface-coated reflecting surface. Accordingly, it is possible to reduce the Petzval sum, which affects curvature of field in particular. This is favorable because a flat image surface can be obtained. At the same time, no chromatic aberration is produced because the surface concerned is a reflecting surface. This is favorable from the viewpoint of performance.

If the rotationally asymmetric surface used in the present invention has a plane of symmetry approximately coincident with the decentration plane of each decentered surface, both sides of the plane of symmetry can be made symmetric. This makes it possible to favorably effect aberration correction and to improve the productivity to a considerable extent.

In any of the foregoing cases, it is desirable to satisfy the following conditions.

The following conditions relate to a bow-shaped rotationally asymmetric image distortion in which a horizontal line, for example, is undesirably curved in a bow shape when imaged. As shown in FIG. 14, it is assumed that DY denotes the difference between the value of the tangent in the YZ-plane of a line normal to the rotationally asymmetric surface at a point where a principal ray at the maximum field angle in the X-axis direction intersects the rotationally asymmetric surface at the wide-angle end and the value of the tangent in the YZ-plane of a line normal to the rotationally asymmetric surface at a point where the axial principal ray intersects the rotationally asymmetric surface at the wide-angle end. In this case, it is important to satisfy the following condition:

$$|DY| < 0.5 \quad (3\text{-}1)$$

If $|DY|$ is not smaller than the upper limit of the condition (3-1), i.e. 0.5, a bow-shaped image distortion is overcorrected. Consequently, the image is distorted in a bow shape.

It is more desirable to satisfy the following condition:

$$|DY| < 0.2 \quad (3\text{-}2)$$

The following conditions relate to a trapezoidal image distortion. Assuming that the direction of decentration of the rotationally asymmetric surface is in the YZ-plane, it is important to satisfy either of the following conditions:

$$|Cxn| < 1 \quad (4\text{-}1)$$

$$1 < |Cxn| < 10 \quad (4\text{-}2)$$

where Cxn denotes the ratio between the curvature in the X-axis direction of a portion of the rotationally asymmetric surface at which a principal ray at the maximum field angle in the positive direction of the Y-axis impinges on the surface at the wide-angle end and the curvature in the X-axis direction of a portion of the rotationally asymmetric surface at which a principal ray at the maximum field angle in the negative direction of the Y-axis impinges on the surface at the wide-angle end.

If neither of the above conditions is satisfied, when the surface reflects light rays in the positive direction of the Y-axis, a trapezoidal distortion in which the upside of a trapezoid becomes shorter in the negative direction of the Y-axis becomes excessively large and impossible to correct by another surface. When the surface reflects rays in the negative direction of the Y-axis, a trapezoidal distortion in which the upside of a trapezoid becomes shorter in the positive direction of the Y-axis in reverse relation to the above occurs to a considerable extent and becomes difficult to correct by another surface. When |Cxn| is 1, a trapezoidal distortion produced by this surface cannot be reduced, but it is left uncorrected. In other words, it is important that |Cxn| should assume a value within the range defined by the condition (4-1) or (4-2), exclusive of 1, to cancel the image distortion with good balance with another surface.

It is more desirable to satisfy the following condition (4-3) or (4-4):

$$|Cxn|<0.5 \quad (4\text{-}3)$$

$$1<|Cxn|<3 \quad (4\text{-}4)$$

The following conditions relate to the power of the rotationally asymmetric surface. At the wide-angle end, light rays having a small height d relative to the X- and Y-axis directions, respectively, are passed through the first surface of the objective optical system of the real-image finder in parallel to the axial principal ray. The sine of a tilt angle with respect to the axial principal ray of each of the above-described rays when emanating from the surface closest to the intermediate image among surfaces participating in the formation of the intermediate image is divided by the height d, and the resulting value is defined as a power for forming the intermediate image in each of the X- and Y-axis directions. The powers in the X- and Y-axis directions are denoted by PX and PY, respectively. Powers in the X- and Y-directions of the rotationally asymmetric surface near the axial principal ray are denoted by PXn and PYn, respectively. On this assumption, it is important to satisfy the following conditions:

$$0<|PXn/PX|<1 \quad (5\text{-}1)$$

$$0<|PYn/PY|<1 \quad (5\text{-}2)$$

These conditions are provided to enable the action of the rotationally asymmetric surface to be exhibited effectively. If |PXn/PX| or |PYn/PY| is not larger than the lower limit of the associated condition, the rotationally asymmetric surface has no power and hence becomes unable to correct rotationally asymmetric decentration aberrations. Consequently, it becomes impossible to achieve a reduction in the size of the objective optical system in the Z-axis direction. If |PXn/PX| or |PYn/PY| is not smaller than the upper limit, i.e. 1, the power of the rotationally asymmetric surface becomes excessively strong. Consequently, rotationally asymmetric aberrations produced by the rotationally asymmetric surface become excessively large and impossible to correct by another surface.

It is more desirable from the viewpoint of aberration correction and surface making to satisfy the following conditions:

$$0<|PXn/PX|<0.6 \quad (5\text{-}3)$$

$$0<|PYn/PY|<0.6 \quad (5\text{-}4)$$

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples of the real-image finder according to the present invention will be described below.

Figure 1A:
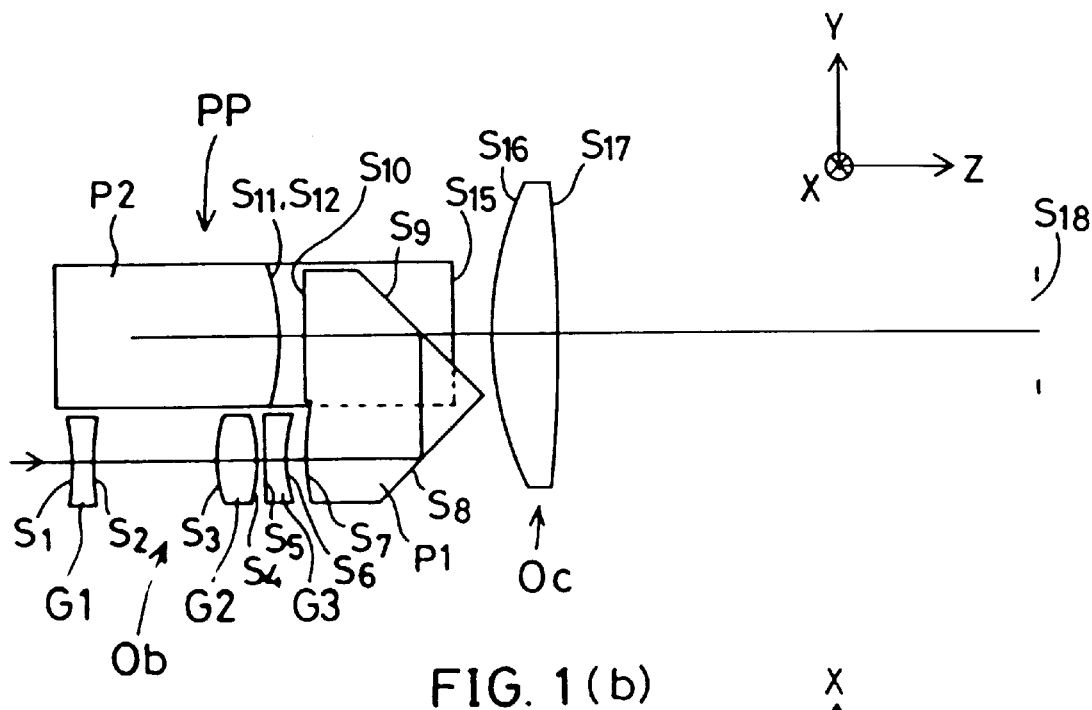
FIG. 1 is a sectional view of a real-image finder according to Example 1 of the present invention at the wide-angle end.
Figure 1B:
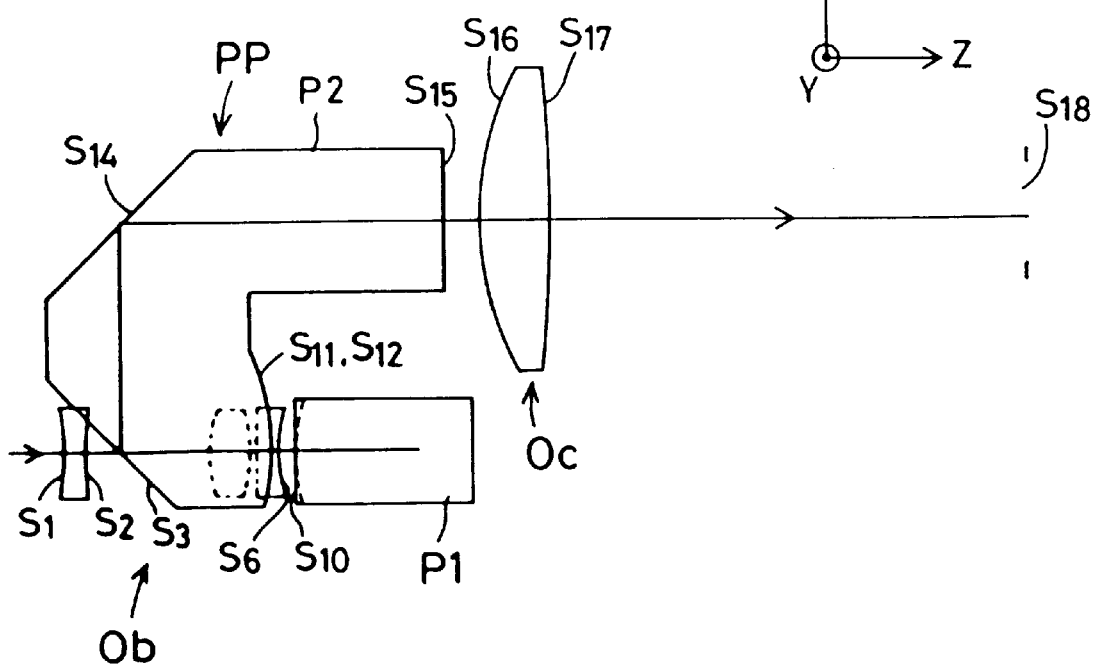

FIG. 1 is a sectional view of a real-image finder according to Example 1 at the wide-angle end, taken along the YZ-plane (a) and along the XZ-plane (b). First, a coordinate system used in the following description will be explained. It is assumed that a light ray passing through the center of a distant object point and passing through the center of an aperture of an objective optical system Ob to reach the center of an intermediate image plane $S_{11}$ and further passing through an ocular optical system Oc to enter the center of an exit pupil is defined as an axial principal ray. It is also assumed that an optical axis defined by a straight line along which the axial principal ray travels until it intersects a first surface $S_1$ of the optical system is defined as a Z-axis.

An axis perpendicularly intersecting the Z-axis in the decentration plane of each decentered surface constituting the real-image finder is defined as a Y-axis. An axis perpendicularly intersecting both the Z- and Y-axes is defined as an X-axis.

As shown in FIG. 1, Example 1 is a real-image finder that includes, in order from the object side thereof, an objective optical system Ob having a positive refracting power, an image-inverting optical system PP using a Porro prism as an image-inverting optical member, and an ocular optical system Oc having a positive refracting power. Reference characters $S_1$ to $S_{18}$ are given to surfaces constituting the optical system in order from the object side thereof. The numerical subscripts correspond to surface Nos. in constituent parameters (described later). It should be noted that the intermediate image plane is at $S_{11}$, and the eyepoint is at $S_{18}$.

More specifically, the objective optical system Ob is a zoom lens system with a zoom ratio of about 3. The zoom lens system includes, in order from the object side thereof, a first lens unit G1 having a negative refracting power, a second lens unit G2 having a positive refracting power, and a third lens unit G3 having a negative refracting power. The zoom lens system performs zooming by varying the spacing between each pair of lens units of the three. A rotationally symmetric aspherical surface given by the following equation (d) is used as each of the third, fourth and fifth surfaces $S_3$, $S_4$ and $S_5$. The Porro prism used as the image-inverting optical system PP includes two blocks P1 and P2 each having two reflecting surfaces. That is, the block P1 has reflecting surfaces $S_8$ and $S_9$, and the block P2 has reflecting surfaces $S_{13}$ and $S_{14}$. An intermediate image of an object is formed by the objective optical system Ob at the intermediate image plane $S_{11}$, which is located between the two blocks P1 and P2. In this example, the block P1 of the Porro prism is on the object side of the intermediate image. A rotationally asymmetric surface given by the following equation (a) is used as each of the two reflecting surfaces $S_8$ and $S_9$ of the block P1. At the same time, a curvature is given to an entrance-side refracting surface $S_7$ of the object-side block P1, and a rotationally symmetric aspherical surface given by the following equation (d) is used as the refracting surface $S_7$. The ocular optical system Oc consists essentially of a single positive lens. A rotationally symmetric aspherical surface given by the following equation (d) is used as an object-side surface $S_{16}$ of the positive lens.

Rotationally symmetric aspherical surfaces in this example are given by $$Z=(y^2/R)/[1+\{1-(1+K)y^2/R^2\}^{1/2}]Ay^4+By^6+Cy^8+Dy^{10}+\ldots \quad (d)$$

In the above equation, Z is an optical axis (axial principal ray) for which the direction of travel of light is defined as a positive direction, and y is taken in a direction perpendicular to the optical axis. R is a paraxial curvature radius, K is a conical coefficient, and A, B, C, D ... are 4th-, 6th-, 8th- and 10th-order aspherical coefficients, respectively. The Z-axis of this defining equation is the axis of the rotationally symmetric aspherical surface.

Rotationally asymmetric surfaces in this example are given by $$Z = C_2 + C_3 y + C_4 x + C_5 y^2 + C_6 yx + C_7 x^2 + C_8 y^3 + \quad (a)$$
$$C_9 y^2 x + C_{10} yx^2 + C_{11} x^3 + C_{12} y^4 + C_{13} y^3 x + C_{14} y^2 x^2 +$$
$$C_{15} yx^3 + C_{16} x^4 + C_{17} y^5 + C_{18} y^4 x + C_{19} y^3 x^2 + C_{20} y^2 x^3 +$$

-continued
$$C_{21} yx^4 + C_{22} x^5 + C_{23} y^6 + C_{24} y^5 x + C_{25} y^4 x^2 + C_{26} y^3 x^3 +$$
$$C_{27} y^2 x^4 + C_{28} yx^5 + C_{29} x^6 + C_{30} y^7 + C_{31} y^6 x + C_{32} y^5 x^2 +$$
$$C_{33} y^4 x^3 + C_{34} y^3 x^4 + C_{35} y^2 x^5 + C_{36} yx^6 + C_{37} x^7$$

The Z-axis of the defining equation is the axis of the rotationally asymmetric surface.

Figure 2A:
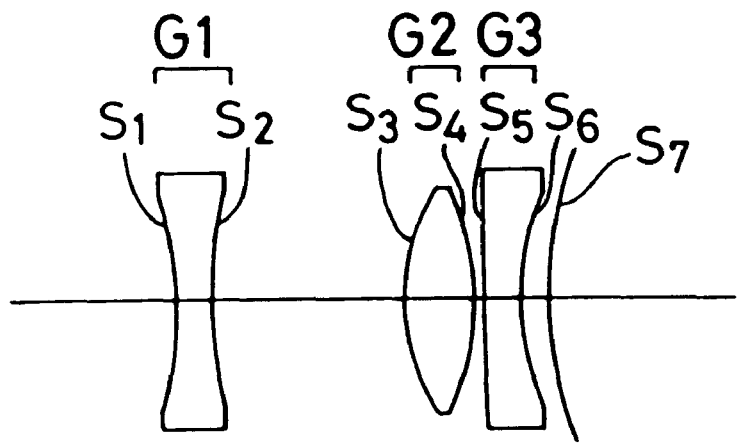
FIG. 2 is a diagram showing the positions of each lens unit of an objective optical system in Example 1 at the wide-angle end (a), standard position (b) and telephoto end (c).
Figure 2B:
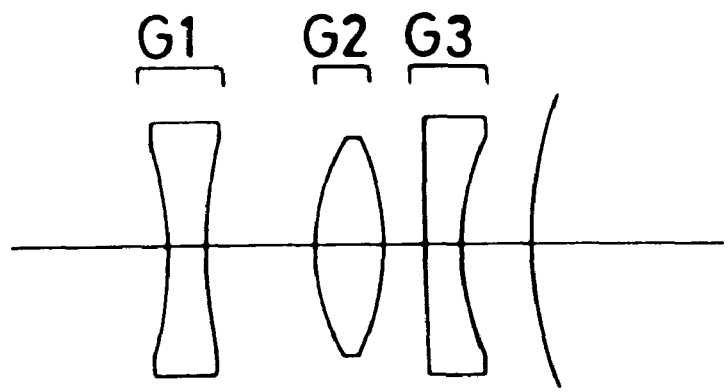
Figure 2C:
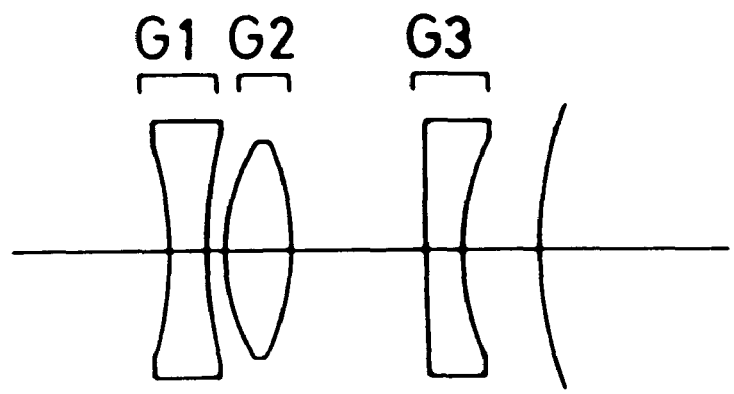

The zoom lens system that constitutes the objective optical system Ob will be described more specifically. FIG. 2 shows the positions of the lens units G1 to G3 of the objective optical system Ob in Example 1 at the wide-angle end (a), standard position (b) and telephoto end (c), respectively, with respect to the entrance-side refracting surface $S_7$ of the image-inverting optical system PP. The first lens unit G1 consists essentially of a biconcave negative lens. The second lens unit G2 consists essentially of a biconvex positive lens. The third lens unit G3 consists essentially of a biconcave negative lens. During zooming from the wide-angle end to the telephoto end, each lens unit moves as follows: The first lens unit G1 moves slightly backward from the object side toward the observation side during movement from the wide-angle end to the standard position. During movement from the standard position to the telephoto end, the first lens unit G1 moves forward from the observation side toward the object side. At the telephoto end, the first lens unit G1 reaches the same position as that at the wide-angle end. The second and third lens units G2 and G3 move forward from the observation side toward the object side. As to the speed of the lens movement, the second lens unit G2 is higher than the third lens unit G3.

With the above-described arrangement, the real-image finder according to Example 1 has a power inside the Porro prism placed between the objective optical system Ob and an intermediate image of an object formed thereby. Accordingly, it is possible to reduce the back focus effectively while maintaining the optical path length necessary for image inversion. Thus, it becomes unnecessary for the objective optical system Ob to adopt an extreme retrofocus type power distribution and hence possible to reduce the size of the objective optical system Ob in the Z-axis direction.

In this example, the horizontal half field angle is 22.258 degrees, 15.043 degrees and 9.240 degrees at the three positions, respectively, and the vertical half field angle is 12.586 degrees, 8.542 degrees and 5.275 degrees. The pupil diameter is 4 millimeters.

Constituent parameters in this example will be shown later. Regarding each decentered surface in the constituent parameters, a point that is given by a spacing defined by a distance from the preceding surface along the axial principal ray emanating from the preceding surface is defined as an origin. A direction in which the axial principal ray travels from the origin is defined as a new Z-axis. A direction perpendicularly intersecting the new Z-axis in the YZ-plane is defined as a new Y-axis. A direction perpendicularly intersecting the new Z-axis in the XZ-plane is defined as a new X-axis. Each decentered surface is given displacements (x, y and z, respectively) in the new X-, Y- and Z-axis directions with respect to the origin and tilt angles (degrees) of the center axis of the surface [the Z-axis of the equation (a) in regard to free-form surfaces; the Z-axis of the equation (d) in regard to rotationally symmetric aspherical surfaces] with respect to the new X-, Y- and Z-axes ($\alpha$, $\beta$ and $\gamma$, respectively). In this case, positive $\alpha$ and $\beta$ mean counterclockwise rotation relative to the positive directions of the corresponding axes, and positive $\gamma$ means clockwise rotation relative to the positive direction of the Z-axis. In addition, the paraxial curvature radius of each of spherical and (rotationally symmetric) aspherical surfaces, surface separation (sign is inverted after reflection), refractive index and Abbe's number of each medium are given according to the conventional method. In the constituent parameters (shown later), those terms concerning aspherical surfaces for which no data is shown are zero. The refractive index is expressed by the refractive index for the spectral d-line (wavelength: 587.56 nanometers). Lengths are given in millimeters. It should, however, be noted that the optical system according to this example can be applied to other sizes by multiplying the entire optical system by arbitrary coefficients. The same shall apply to Examples 2 to 5.

Figure 3A:
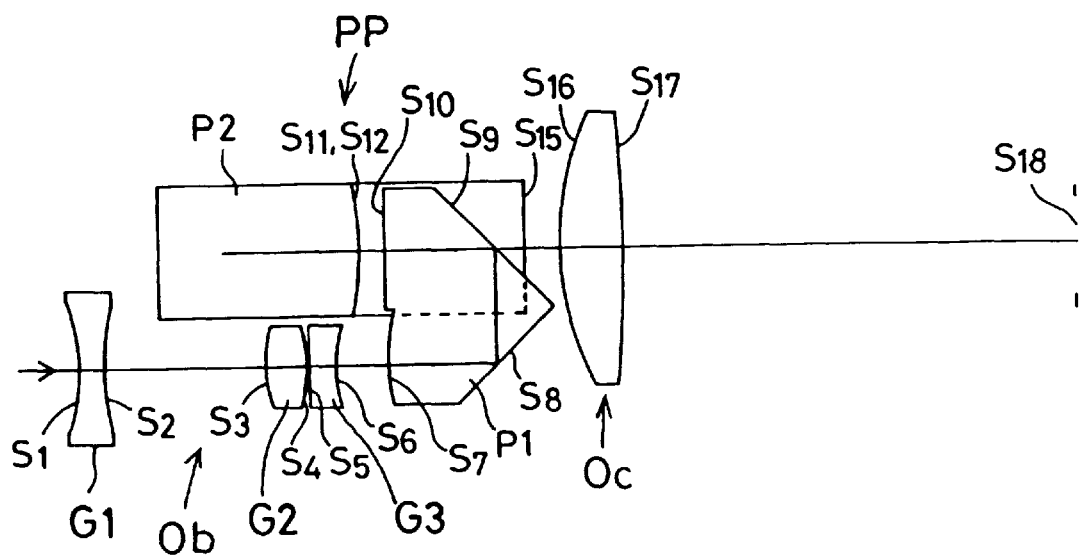
FIG. 3(a) and 3(b) is a sectional view of a real-image finder according to Example 2 of the present invention at the wide-angle end.
Figure 3B:
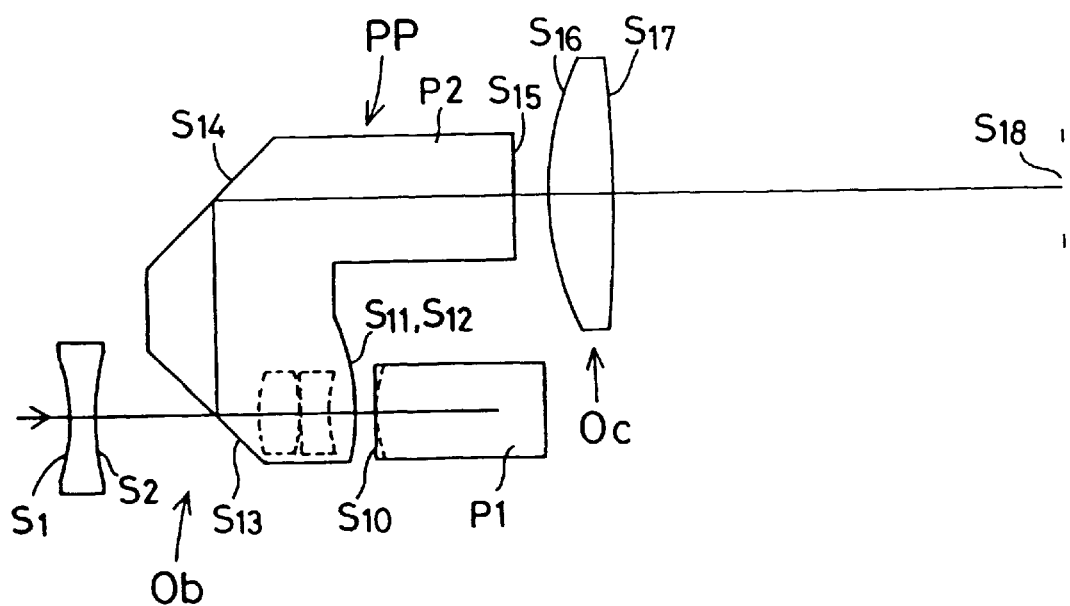
Figure 4A:
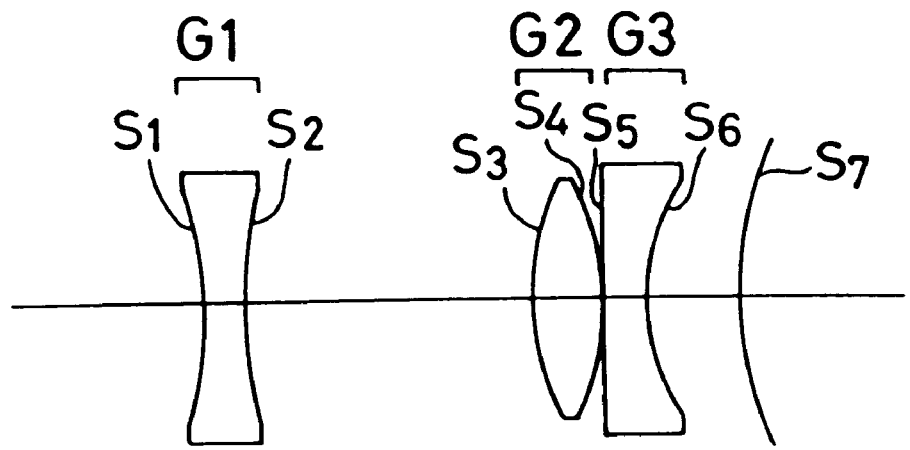
FIG. 4 is a diagram showing the positions of each lens unit of an objective optical system in Example 2 at the wide-angle end (a), standard position (b) and telephoto end (c).
Figure 4B:
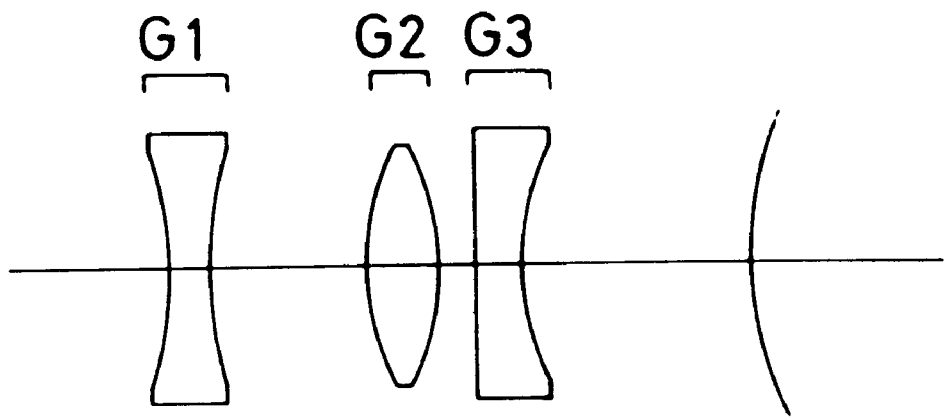
Figure 4C:
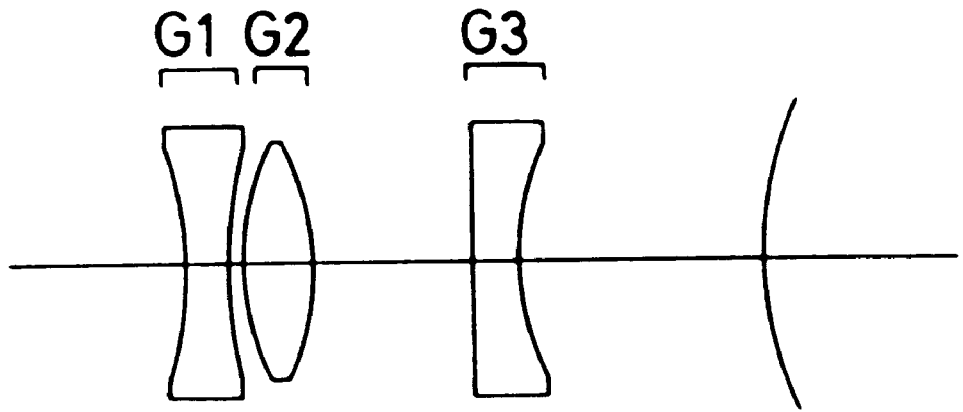

FIG. 3 is a sectional view of a real-image finder according to Example 2, which is similar to FIG. 1. FIG. 4 shows the positions of lens units G1 to G3 of the real-image finder according to Example 2 in the same way as in FIG. 2. In Example 2, the zoom ratio is increased to the order of 4 with the same arrangement as in Example 1.

As shown in FIG. 3, Example 2 is a real-image finder that includes, in order from the object side thereof, an objective optical system Ob having a positive refracting power, an image-inverting optical system PP using a Porro prism as an image-inverting optical member, and an ocular optical system Oc having a positive refracting power. Reference characters $S_1$ to $S_{18}$ are given to surfaces constituting the optical system in order from the object side thereof. The numerical subscripts correspond to surface Nos. in constituent parameters (described later). It should be noted that the intermediate image plane is at $S_{11}$, and the eyepoint is at $S_{18}$.

The objective optical system Ob is a zoom lens system with a zoom ratio of about 4. The zoom lens system includes, in order from the object side thereof, a first lens unit G1 having a negative refracting power, a second lens unit G2 having a positive refracting power, and a third lens unit G3 having a negative refracting power. The zoom lens system performs zooming by varying the spacing between each pair of lens units of the three. A rotationally symmetric aspherical surface given by the equation (d) is used as each of the third, fourth and fifth surfaces $S_3$, $S_4$ and $S_5$. The Porro prism used as the image-inverting optical system PP includes two blocks P1 and P2 each having two reflecting surfaces. That is, the block P1 has reflecting surfaces $S_8$ and $S_9$, and the block P2 has reflecting surfaces $S_{13}$ and $S_{14}$. An intermediate image of an object is formed by the objective optical system Ob at the intermediate image plane $S_{11}$, which is located between the two blocks P1 and P2. In this example, the block P1 of the Porro prism is on the object side of the intermediate image. A rotationally asymmetric surface given by the equation (a) is used as each of the two reflecting surfaces $S_8$ and $S_9$ of the block P1. At the same time, a curvature is given to an entrance-side refracting surface $S_7$ of the object-side block P1, and a rotationally symmetric aspherical surface given by the equation (d) is used as the refracting surface $S_7$. The ocular optical system Oc consists essentially of a single positive lens. A rotationally symmetric aspherical surface given by the equation (d) is used as an object-side surface $S_{16}$ of the positive lens.

The zoom lens system that constitutes the objective optical system Ob will be described more specifically. FIG. 4 shows the positions of the lens units G1 to G3 of the objective optical system Ob at the wide-angle end (a), standard position (b) and telephoto end (c), respectively, with respect to the entrance-side refracting surface $S_7$ of the image-inverting optical system PP. The first lens unit G1 consists essentially of a biconcave negative lens. The second lens unit G2 consists essentially of a biconvex positive lens. The third lens unit G3 consists essentially of a biconcave negative lens. During zooming from the wide-angle end to the telephoto end, each lens unit moves as follows: The first lens unit G1 moves slightly forward from the observation side toward the object side during movement from the wide-angle end to the standard position. During movement from the standard position to the telephoto end, the first lens unit G1 remains at the same position. The second and third lens units G2 and G3 move forward from the observation side toward the object side. As to the speed of the lens movement, the second lens unit G2 is higher than the third lens unit G3.

In Example 2, the horizontal half field angle is 22.258 degrees, 12.501 degrees and 6.629 degrees at the three positions, respectively, and the vertical half field angle is 12.586 degrees, 7.262 degrees and 3.799 degrees. The pupil diameter is 4 millimeters.

Figure 5A:
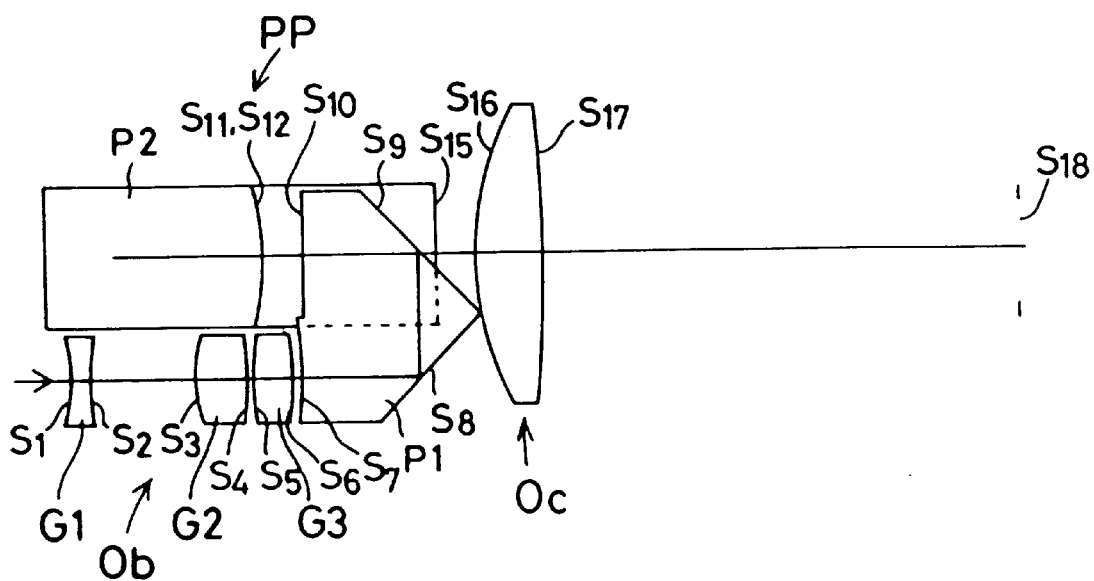
FIG. 5(a) and 5(b) is a sectional view of a real-image finder according to Example 3 of the present invention at the wide-angle end.
Figure 5B:
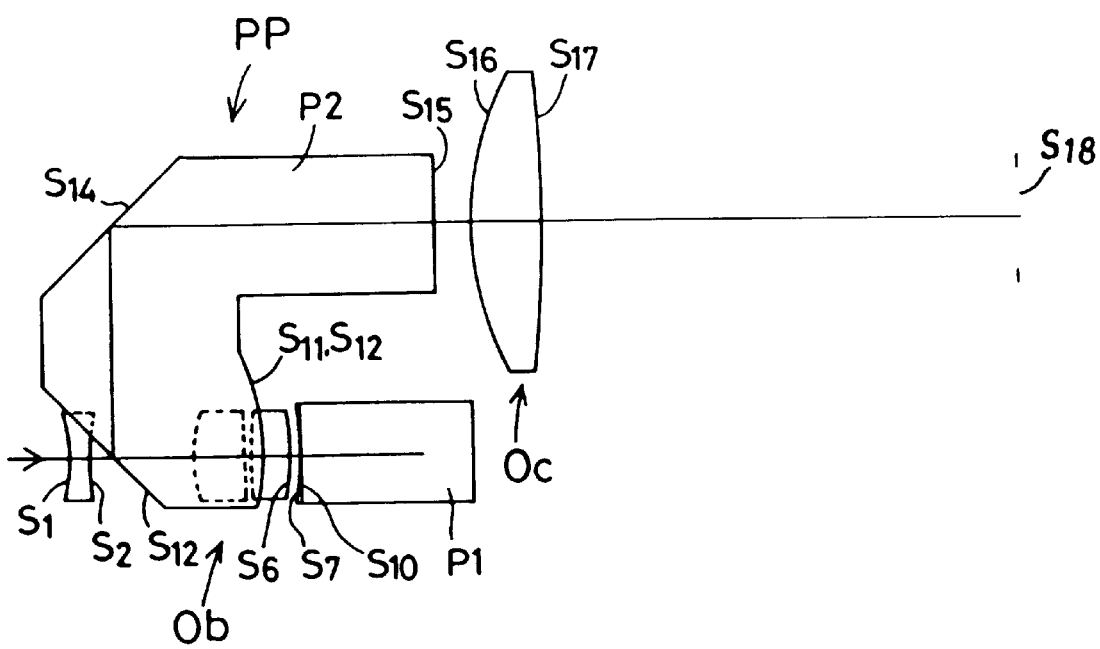
Figure 6A:
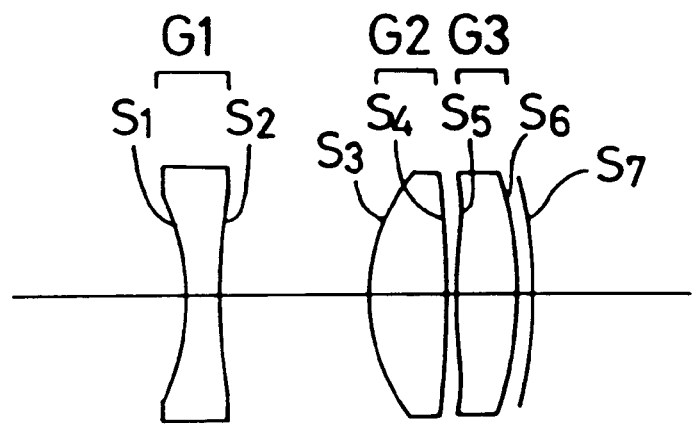
FIG. 6 is a diagram showing the positions of each lens unit of an objective optical system in Example 3 at the wide-angle end (a), standard position (b) and telephoto end (c).
Figure 6B:
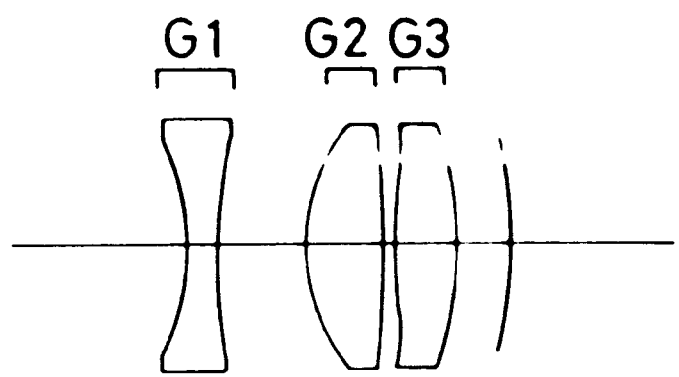
Figure 6C:
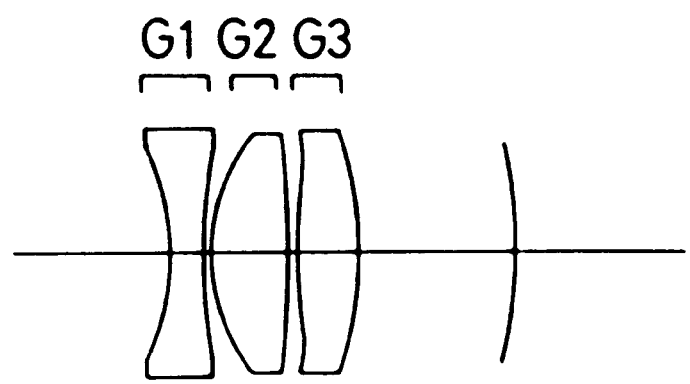

FIG. 5 is a sectional view of a real-image finder according to Example 3, which is similar to FIG. 1. FIG. 6 shows the positions of lens units G1 to G3 of the real-image finder according to Example 3 in the same way as in FIG. 2. As shown in FIG. 5, Example 3 is a real-image finder that includes, in order from the object side thereof, an objective optical system Ob having a positive refracting power, an image-inverting optical system PP using a Porro prism as an image-inverting optical member, and an ocular optical system Oc having a positive refracting power. Reference characters $S_1$ to $S_{18}$ are given to surfaces constituting the optical system in order from the object side thereof. The numerical subscripts correspond to surface Nos. in constituent parameters (described later). It should be noted that the intermediate image plane is at $S_{11}$, and the eyepoint is at $S_{18}$.

The objective optical system Ob is a zoom lens system with a zoom ratio of about 3. The zoom lens system includes, in order from the object side thereof, a first lens unit G1 having a negative refracting power, a second lens unit G2 having a positive refracting power, and a third lens unit G3 having a positive refracting power. The zoom lens system performs zooming by varying the spacing between each pair of lens units of the three. A rotationally symmetric aspherical surface given by the equation (d) is used as each of the second, third and fifth surfaces $S_2$, $S_3$ and $S_5$. The Porro prism used as the image-inverting optical system PP includes two blocks P1 and P2 each having two reflecting surfaces. That is, the block P1 has reflecting surfaces $S_8$ and $S_9$, and the block P2 has reflecting surfaces $S_{13}$ and $S_{14}$. An intermediate image of an object is formed by the objective optical system Ob at the intermediate image plane $S_{11}$, which is located between the two blocks P1 and P2. In this example, the block P1 of the Porro prism is on the object side of the intermediate image. A rotationally asymmetric surface given by the equation (a) is used as each of the two reflecting surfaces $S_8$ and $S_9$ of the block P1. At the same time, a curvature is given to an entrance-side refracting surface $S_7$ of the object-side block P1, and a rotationally symmetric aspherical surface given by the equation (d) is used as the refracting surface $S_7$. The ocular optical system Oc consists essentially of a single positive lens. A rotationally symmetric aspherical surface given by the equation (d) is used as an object-side surface $S_{16}$ of the positive lens.

The zoom lens system that constitutes the objective optical system Ob will be described more specifically. FIG. 6 shows the positions of the lens units G1 to G3 of the objective optical system Ob at the wide-angle end (a), standard position (b) and telephoto end (c), respectively, with respect to the entrance-side refracting surface $S_7$ of the image-inverting optical system PP. The first lens unit G1 consists essentially of a biconcave negative lens. The second lens unit G2 consists essentially of a biconvex positive lens. The third lens unit G3 consists essentially of a biconvex positive lens. During zooming from the wide-angle end to the telephoto end, each lens unit moves as follows: The first lens unit G1 moves slightly backward from the object side toward the observation side during movement from the wide-angle end to the standard position. During movement from the standard position to the telephoto end, the first lens unit G1 moves forward from the observation side toward the object side. At the telephoto end, the first lens unit G1 reaches the same position as at the wide-angle end. The second and third lens units G2 and G3 move forward from the observation side toward the object side at approximately the same speed. The spacing between the two lens units G2 and G3 widens slightly at the standard position.

With the above-described arrangement, the real-image finder according to Example 3 also has a power inside the Porro prism placed between the objective optical system Ob and an intermediate image of an object formed thereby. Accordingly, it is possible to reduce the back focus effectively while maintaining the optical path length necessary for image inversion. Thus, it becomes unnecessary for the objective optical system Ob to adopt an extreme retrofocus type power distribution and hence possible to reduce the size of the objective optical system Ob in the Z-axis direction.

In Example 3, the horizontal half field angle is 22.258 degrees, 15.043 degrees and 9.240 degrees at the three positions, respectively, and the vertical half field angle is 12.586 degrees, 8.542 degrees and 5.275 degrees. The pupil diameter is 4 millimeters.

Example 4 (not shown) is a real-image finder arranged as in the case of Example 1. The real-image finder in Example 4 is about 10% larger in size in the Z-axis direction than in Example 1. In this example, during zooming from the wide-angle end to the telephoto end, the first lens unit G1 is fixed, while the second lens unit G2 and the third lens unit G3 move forward from the observation side toward the object side. As to the speed of the lens movement, the second lens unit G2 is higher than the third lens unit G3. The other arrangements are similar to those in Example 1. In this example, the horizontal half field angle is 22.258 degrees, 15.043 degrees and 9.240 degrees at the three positions, respectively, and the vertical half field angle is 12.586 degrees, 8.542 degrees and 5.275 degrees. The pupil diameter is 4 millimeters.

Example 5 (not shown) is a real-image finder arranged as in the case of Example 3. In this example, the refractive index of the Porro prism PP is set smaller than in Example 3. Therefore, the real-image finder in Example 5 is about 10% larger in size in the Z-axis direction than in Example 3. In this example, the horizontal half field angle is 22.258 degrees, 15.043 degrees and 9.240 degrees at the three positions, respectively, and the vertical half field angle is 12.586 degrees, 8.542 degrees and 5.275 degrees. The pupil diameter is 4 millimeters.

Constituent parameters of the above-described Examples 1 to 5 are shown below. In the constituent parameters, rotationally asymmetric surfaces are denoted by FFS (free-form surface), and aspherical surfaces by ASS.

| | | Example 1 | | | |
|---|---|---|---|---|---|
| Surface No. | Radius of curvature | Surface separation | Displacement and tilt | Refractive index | Abbe's No. |
| Object plane | ∞ | 3000.0000 | | | |
| 1 | 31 7.749 | 0.80 | | 1.5842 | 30.5 |
| 2 | 11.413 | $d_1$ | | | |
| 3 | 4.505 (ASS1) | 1.61 | | 1.5254 | 55.8 |
| 4 | −5.437 (ASS2) | $d_2$ | | | |
| 5 | −1847.945 (ASS3) | 0.80 | | 1.5842 | 30.5 |
| 6 | 5.313 | $d_3$ | | | |
| 7 | 8.130 (ASS4) | 4.62 | | 1.5254 | 55.8 |
| 8 | FFS [1] | −4.62 | (1) | 1.5254 | 55.8 |
| 9 | FFS [2] | 4.62 | (2) | 1.5254 | 55.8 |
| 10 | ∞ | 0.97 | | | |
| 11 | ∞ | 0.00 | | | |
| | (Intermediate image plane) | | | | |
| 12 | 9.846 | 5.79 | | 1.5254 | 55.8 |
| 13 | ∞ | −8.79 | (3) | 1.5254 | 55.8 |
| 14 | ∞ | 12.58 | (3) | 1.5254 | 55.8 |
| 15 | ∞ | 1.46 | | | |
| 16 | 11.119 (ASS5) | 2.62 | | 1.4924 | 57.6 |
| 17 | −67.545 | 18.50 | | | |
| 18 | ∞ | | | | |
| (Eyepoint) | | | | | |

FFS[1]

| | | | | | |
|---|---|---|---|---|---|
| $C_5$ | $-2.4937 \times 10^{-3}$ | $C_7$ | $-3.4545 \times 10^{-3}$ | $C_8$ | $2.6695 \times 10^{-4}$ |
| $C_{10}$ | $2.2002 \times 10^{-4}$ | $C_{12}$ | $1.0609 \times 10^{-4}$ | $C_{14}$ | $2.5059 \times 10^{-6}$ |
| $C_{16}$ | $5.0435 \times 10^{-5}$ | $C_{17}$ | $-2.5521 \times 10^{-5}$ | | |

FFS [2]

-continued

| | | | | | |
|---|---|---|---|---|---|
| $C_5$ | $9.0788 \times 10^{-4}$ | $C_7$ | $-1.6146 \times 10^{-3}$ | $C_8$ | $4.1934 \times 10^{-4}$ |
| $C_{10}$ | $8.6143 \times 10^{-5}$ | $C_{12}$ | $-1.9168 \times 10^{-4}$ | $C_{14}$ | $3.4457 \times 10^{-5}$ |
| $C_{16}$ | $5.1791 \times 10^{-6}$ | $C_{17}$ | $-2.3326 \times 10^{-5}$ | | |

ASS1

| | | | | | |
|---|---|---|---|---|---|
| K | −0.328212 | A | $-0.169591 \times 10^{-2}$ | B | $0.134380 \times 10^{-4}$ |
| | | C | $-0.189746 \times 10^{-4}$ | D | $0.194669 \times 10^{-5}$ |

ASS2

| | | | | | |
|---|---|---|---|---|---|
| K | −2.693802 | A | $-0.832644 \times 10^{-4}$ | B | $0.737555 \times 10^{-4}$ |
| | | C | $-0.343977 \times 10^{-4}$ | D | $0.328486 \times 10^{-5}$ |

ASS3

| | | | | | |
|---|---|---|---|---|---|
| K | 462457.2732 | A | $0.204519 \times 10^{-2}$ | B | $-0.658153 \times 10^{-3}$ |
| | | C | $0.869289 \times 10^{-4}$ | D | $-0.372509 \times 10^{-5}$ |

ASS4

| | | | | | |
|---|---|---|---|---|---|
| K | −20.838307 | A | $0.179507 \times 10^{-2}$ | B | $0.184123 \times 10^{-3}$ |
| | | C | $-0.546979 \times 10^{-4}$ | D | $0.305275 \times 10^{-5}$ |

ASS5

| | | | | | |
|---|---|---|---|---|---|
| K | 0.414550 | A | $-0.239353 \times 10^{-3}$ | B | $0.998505 \times 10^{-5}$ |
| | | C | $-0.519584 \times 10^{-6}$ | D | $0.802739 \times 10^{-8}$ |

Displacement and tilt (1)

| | | | | | |
|---|---|---|---|---|---|
| x | 0.000 | y | 0.000 | z | 0.000 |
| α | 135.00 | β | 0.00 | γ | 0.00 |

Displacement and tilt (2)

| | | | | | |
|---|---|---|---|---|---|
| x | 0.000 | y | 0.000 | z | 0.000 |
| α | −45.00 | β | 0.00 | γ | 0.00 |

Displacement and tilt (3)

| | | | | | |
|---|---|---|---|---|---|
| x | 0.000 | y | 0.000 | z | 0.000 |
| α | 0.00 | β | 45.00 | γ | 0.00 |

Zooming Spaces

| | Wide-end | Standard position | Telephoto-end |
|---|---|---|---|
| $d_1$ | 4.78741 | 2.78765 | 0.50000 |
| $d_2$ | 0.20000 | 1.02683 | 3.27793 |
| $d_3$ | 0.80000 | 1.86903 | 2.00948 |
| $f_1 f_w =$ | −0.463 | | |
| $d_{z2}/d_{z1} =$ | −0.718 | | |

8th surface

DY = −0.032269
Cxn = 0.001287
PXn/PX = 0.161172
PYn/PY = 0.112648

9th surface

DY = −0.023888
Cxn = 0.000526
PXn/PX = 0.075338
PYn/PY = 0.041007

Example 2

| Surface No. | Radius of curvature | Surface separation | Displacement and tilt | Refractive index | Abbe's No. |
|---|---|---|---|---|---|
| Object plane | ∞ | 3000.0000 | | | |
| 1 | −8.073 | 1.00 | | 1.5842 | 30.5 |
| 2 | 11.506 | $d_1$ | | | |
| 3 | 4.576 (ASS1) | 1.80 | | 1.5254 | 55.8 |
| 4 | −5.496 (ASS2) | $d_2$ | | | |
| 5 | −1450.283 (ASS3) | 1.00 | | 1.5842 | 30.5 |
| 6 | 4.896 | $d_3$ | | | |
| 7 | 7.905 (ASS4) | 4.62 | | 1.5254 | 55.8 |
| 8 | FFS [1] | −4.62 | (1) | 1.5254 | 55.8 |
| 9 | FFS [2] | 4.62 | (2) | 1.5254 | 55.8 |
| 10 | ∞ | 0.97 | | | |
| 11 | ∞ | 0.00 | | | |
| (Intermediate image plane) | | | | | |
| 12 | 9.846 | 5.79 | | 1.5254 | 55.8 |
| 13 | ∞ | −8.79 | (3) | 1.5254 | 55.8 |
| 14 | ∞ | 12.58 | (3) | 1.5254 | 55.8 |
| 15 | ∞ | 1.46 | | | |
| 16 | 11.119 (ASS5) | 2.62 | | 1.4924 | 57.6 |

-continued

| | | | | | |
|---|---|---|---|---|---|
| 17 | −67.545 | 18.50 | | | |
| 18 | ∞ | | | | |
| | (Eyepoint) | | | | |

FFS [1]

| | | | | | |
|---|---|---|---|---|---|
| $C_5$ | $-3.2064 \times 10^{-3}$ | $C_7$ | $-5.5794 \times 10^{-3}$ | | |

FFS [2]

| | | | | | |
|---|---|---|---|---|---|
| $C_5$ | $-3.1083 \times 10^{-3}$ | $C_7$ | $-7.9326 \times 10^{-3}$ | | |

ASS1

| | | | | | |
|---|---|---|---|---|---|
| K | −0.363217 | A | $-0.161120 \times 10^{-3}$ | B | $-0.502808 \times 10^{-4}$ |
| | | C | $-0.180331 \times 10^{-5}$ | D | $0.217446 \times 10^{-6}$ |

ASS2

| | | | | | |
|---|---|---|---|---|---|
| K | −3.089352 | A | $-0.631867 \times 10^{-3}$ | B | $0.924280 \times 10^{-5}$ |
| | | C | $-0.684861 \times 10^{-5}$ | D | $0.458271 \times 10^{-6}$ |

ASS3

| | | | | | |
|---|---|---|---|---|---|
| K | $-0.138466 \times 10^{+12}$ | A | $-0.248918 \times 10^{-3}$ | B | $-0.133924 \times 10^{-3}$ |
| | | C | $0.294023 \times 10^{-4}$ | D | $-0.166284 \times 10^{-5}$ |

ASS4

| | | | | | |
|---|---|---|---|---|---|
| K | −1.394206 | A | $0.434082 \times 10^{-3}$ | B | $0.197969 \times 10^{-4}$ |
| | | C | $0.158307 \times 10^{-6}$ | D | $-0.202573 \times 10^{-6}$ |

ASS5

| | | | | | |
|---|---|---|---|---|---|
| K | 0.789940 | A | $-0.291128 \times 10^{-3}$ | B | $0.668794 \times 10^{-5}$ |
| | | C | $0.311071 \times 10^{-6}$ | D | $0.382879 \times 10^{-8}$ |

Displacement and tilt (1)

| | | | | | |
|---|---|---|---|---|---|
| x | 0.000 | y | 0.000 | z | 0.000 |
| α | 135.00 | β | 0.00 | γ | 0.00 |

Displacement and tilt (2)

| | | | | | |
|---|---|---|---|---|---|
| x | 0.000 | y | 0.000 | z | 0.000 |
| α | −45.00 | β | 0.00 | γ | 0.00 |

Displacement and tilt (3)

| | | | | | |
|---|---|---|---|---|---|
| x | 0.000 | y | 0.000 | z | 0.000 |
| α | 0.00 | β | 45.00 | γ | 0.00 |

Zooming Spaces

| | Wide-end | Standard position | Telephoto-end |
|---|---|---|---|
| $d_1$ | 6.65117 | 3.56446 | 0.26193 |
| $d_2$ | 0.10000 | 0.89393 | 3.74185 |
| $d_3$ | 2.12127 | 5.54162 | 5.99623 |
| $f_1/f_w$ = | −0.560 | | |
| $d_{z2}/d_{z1}$ = | −0.586 | | |

8th surface

| | |
|---|---|
| DY = | 0.000000 |
| Cxn = | 0.000000 |
| PXn/PX = | 0.267660 |
| PYn/PY = | 0.151933 |

9th surface

| | |
|---|---|
| DY = | 0.000000 |
| Cxn = | 0.000000 |
| PXn/PX = | 0.380550 |
| PYn/PY = | 0.147285 |

Example 3

| Surface No. | Radius of curvature | Surface separation | Displacement and tilt | Refractive index | Abbe's No. |
|---|---|---|---|---|---|
| Object plane | ∞ | 3000.0000 | | | |
| 1 | −6.04 | 0.80 | | 1.5842 | 30.5 |
| 2 | 12.01 (ASS1) | $d_1$ | | | |
| 3 | 4.88 (ASS2) | 2.00 | | 1.5254 | 55.8 |
| 4 | −24.24 | $d_2$ | | | |
| 5 | 11.36 (ASS3) | 1.60 | | 1.5254 | 55.8 |
| 6 | −10.08 | $d_3$ | | | |
| 7 | −11.56 (ASS4) | 4.62 | | 1.5842 | 30.5 |
| 8 | FFS [1] | −4.62 | (1) | 1.5842 | 30.5 |
| 9 | FFS [2] | 4.62 | (2) | 1.5842 | 30.5 |
| 10 | ∞ | 1.50 | | | |
| 11 | ∞ | 0.00 | | | |
| | (Intermediate image plane) | | | | |

-continued

| | | | | | |
|---|---|---|---|---|---|
| 12 | 9.75 | 5.79 | | 1.5254 | 55.8 |
| 13 | ∞ | −8.79 | (3) | 1.5254 | 55.8 |
| 14 | ∞ | 12.58 | (3) | 1.5254 | 55.8 |
| 15 | ∞ | 1.50 | | | |
| 16 | 10.89 (ASS5) | 2.62 | | 1.4924 | 57.6 |
| 17 | −80.78 | 18.50 | | | |
| 18 | ∞ | | | | |
| | (Eyepoint) | | | | |

FFS [1]

| | | | | | |
|---|---|---|---|---|---|
| $C_5$ | $-1.6852 \times 10^{-3}$ | $C_7$ | $-2.4315 \times 10^{-3}$ | $C_8$ | $1.3763 \times 10^{-4}$ |
| $C_{10}$ | $1.3898 \times 10^{-4}$ | $C_{12}$ | $1.8459 \times 10^{-6}$ | $C_{14}$ | $-1.3322 \times 10^{-4}$ |
| $C_{16}$ | $-2.0500 \times 10^{-5}$ | $C_{17}$ | $-2.2610 \times 10^{-6}$ | $C_{19}$ | $1.0057 \times 10^{-5}$ |
| $C_{21}$ | $-4.2329 \times 10^{-5}$ | | | | |

FFS [2]

| | | | | | |
|---|---|---|---|---|---|
| $C_5$ | $7.8527 \times 10^{-4}$ | $C_7$ | $-7.0986 \times 10^{-4}$ | $C_8$ | $6.7723 \times 10^{-5}$ |
| $C_{10}$ | $-8.2393 \times 10^{-6}$ | $C_{12}$ | $-9.9608 \times 10^{-5}$ | $C_{14}$ | $-1.4290 \times 10^{-4}$ |
| $C_{16}$ | $-2.6818 \times 10^{-4}$ | $C_{17}$ | $9.5642 \times 10^{-6}$ | $C_{19}$ | $2.8647 \times 10^{-5}$ |
| $C_{21}$ | $-4.4497 \times 10^{-5}$ | | | | |

(ASS1)

| | | | | | |
|---|---|---|---|---|---|
| K | −1.0748 | A | $-5.2009 \times 10^{-4}$ | B | $1.1973 \times 10^{-4}$ |
| | | C | $-3.2545 \times 10^{-5}$ | D | $2.0110 \times 10^{-6}$ |

ASS2

| | | | | | |
|---|---|---|---|---|---|
| K | $-5.0340 \times 10^{-1}$ | A | $3.7165 \times 10^{-4}$ | B | $1.0333 \times 10^{-4}$ |
| | | C | $-1.2764 \times 10^{-5}$ | D | $8.3066 \times 10^{-7}$ |

ASS3

| | | | | | |
|---|---|---|---|---|---|
| K | $-1.0225 \times 10$ | A | $-1.6205 \times 10^{-3}$ | B | $-2.0873 \times 10^{-4}$ |
| | | C | $8.3978 \times 10^{-6}$ | D | $-1.1485 \times 10^{-6}$ |

ASS4

| | | | | | |
|---|---|---|---|---|---|
| K | $1.4058 \times 10$ | A | $8.4141 \times 10^{-4}$ | B | $3.5573 \times 10^{-4}$ |
| | | C | $-6.2518 \times 10^{-5}$ | D | $6.4473 \times 10^{-6}$ |

ASS5

| | | | | | |
|---|---|---|---|---|---|
| K | $1.0547 \times 10^{-1}$ | A | $-1.9888 \times 10^{-4}$ | B | $4.4837 \times 10^{-6}$ |
| | | C | $-2.1334 \times 10^{-7}$ | D | $3.1991 \times 10^{-9}$ |

Displacement and tilt (1)

| | | | | | |
|---|---|---|---|---|---|
| x | 0.00 | y | 0.00 | z | 0.00 |
| α | 135.00 | β | 0.00 | γ | 0.00 |

Displacement and tilt (2)

| | | | | | |
|---|---|---|---|---|---|
| x | 0.00 | y | 0.00 | z | 0.00 |
| α | −45.00 | β | 0.00 | γ | 0.00 |

Displacement and tilt (3)

| | | | | | |
|---|---|---|---|---|---|
| x | 0.00 | y | 0.00 | z | 0.00 |
| α | 0.00 | β | 45.00 | γ | 0.00 |

Zooming Spaces

| | Wide-end | Standard position | Telephoto-end |
|---|---|---|---|
| $d_1$ | 4.00000 | 2.32479 | 0.30000 |
| $d_2$ | 0.20000 | 0.30000 | 0.20000 |
| $d_3$ | 0.40000 | 1.43124 | 4.10000 |
| $f_1/f_w$ = | −1.436 | | |
| $d_{z2}/d_{z1}$ = | 0 | | |

8th surface

| | |
|---|---|
| DY = | −0.002521 |
| Cxn = | 0.000969 |
| PXn/PX = | 0.118089 |
| PYn/PY = | 0.080639 |

9th surface

| | |
|---|---|
| DY = | 0.54421 |
| Cxn = | 0.000797 |
| PXn/PX = | 0.034475 |
| PYn/PY = | 0.037576 |

Example 4

| Surface No. | Radius of curvature | Surface separation | Displacement and tilt | Refractive index | Abbe's No. |
|---|---|---|---|---|---|
| Object plane | ∞ | 3000.0000 | | | |
| 1 | −7.642 | 1.00 | | 1.5842 | 30.5 |
| 2 | 12.138 | $d_1$ | | | |
| 3 | 4.541 (ASS1) | 1.80 | | 1.5254 | 55.8 |

-continued

| | | | | | |
|---|---|---|---|---|---|
| 4 | −5.472 (ASS2) | $d_2$ | | | |
| 5 | −263.097 (ASS3) | 1.00 | | 1.5842 | 30.5 |
| 6 | 5.092 | $d_3$ | | | |
| 7 | 7.905 (ASS4) | 4.62 | | 1.5254 | 55.8 |
| 8 | FFS [1] | −4.62 | (1) | 1.5254 | 55.8 |
| 9 | FFS [2] | 4.62 | (2) | 1.5254 | 55.8 |
| 10 | ∞ | 0.97 | | | |
| 11 | ∞ | 0.00 | | | |
| | (Intermediate image plane) | | | | |
| 12 | 9.846 | 5.79 | | 1.5254 | 55.8 |
| 13 | ∞ | −8.79 | (3) | 1.5254 | 55.8 |
| 14 | ∞ | 12.58 | (3) | 1.5254 | 55.8 |
| 15 | ∞ | 1.46 | | | |
| 16 | 11.119 (ASS5) | 2.62 | | 1.4924 | 57.6 |
| 17 | −67.545 | 18.50 | | | |
| 18 | ∞ | | | | |
| | (Eyepoint) | | | | |

FFS [1]

| | | | | | |
|---|---|---|---|---|---|
| $C_5$ | $-2.4646 \times 10^{-3}$ | $C_7$ | $-3.9726 \times 10^{-3}$ | $C_8$ | $2.4035 \times 10^{-4}$ |
| $C_{10}$ | $4.5240 \times 10^{-4}$ | $C_{12}$ | $5.9444 \times 10^{-5}$ | $C_{14}$ | $2.5749 \times 10^{-4}$ |
| $C_{16}$ | $1.7758 \times 10^{-4}$ | $C_{17}$ | $-1.6772 \times 10^{-5}$ | $C_{19}$ | $-5.8164 \times 10^{-5}$ |
| $C_{21}$ | $-4.7464 \times 10^{-5}$ | | | | |

FFS [2]

| | | | | | |
|---|---|---|---|---|---|
| $C_5$ | $1.1417 \times 10^{-3}$ | $C_7$ | $-1.9469 \times 10^{-4}$ | $C_8$ | $2.4035 \times 10^{-4}$ |
| $C_{10}$ | $4.5240 \times 10^{-4}$ | $C_{12}$ | $-1.2588 \times 10^{-4}$ | $C_{14}$ | $-5.0027 \times 10^{-4}$ |
| $C_{16}$ | $-2.9011 \times 10^{-4}$ | $C_{17}$ | $-1.1324 \times 10^{-5}$ | $C_{19}$ | $-8.8847 \times 10^{-5}$ |
| $C_{21}$ | $-1.4614 \times 10^{-6}$ | | | | |

ASS1

| | | | | | |
|---|---|---|---|---|---|
| K | −0.329320 | A | $-0.152103 \times 10^{-2}$ | B | $-0.639381 \times 10^{-4}$ |
| | | C | $-0.519506 \times 10^{-5}$ | D | $0.473690 \times 10^{-6}$ |

ASS2

| | | | | | |
|---|---|---|---|---|---|
| K | −3.282785 | A | $-0.537075 \times 10^{-3}$ | B | $0.990465 \times 10^{-6}$ |
| | | C | $-0.104711 \times 10^{-4}$ | D | $0.774782 \times 10^{-6}$ |

ASS3

| | | | | | |
|---|---|---|---|---|---|
| K | −24372.26332 | A | $-0.495068 \times 10^{-3}$ | B | $-0.141484 \times 10^{-3}$ |
| | | C | $0.297517 \times 10^{-4}$ | D | $-0.129449 \times 10^{-5}$ |

ASS4

| | | | | | |
|---|---|---|---|---|---|
| K | −0.924551 | A | $0.545355 \times 10^{-3}$ | B | $-0.142582 \times 10^{-4}$ |
| | | C | $-0.222236 \times 10^{-5}$ | D | $-0.187769 \times 10^{-6}$ |

ASS5

| | | | | | |
|---|---|---|---|---|---|
| K | 0.789940 | A | $-0.291128 \times 10^{-3}$ | B | $0.668794 \times 10^{-5}$ |
| | | C | $-0.311071 \times 10^{-6}$ | D | $0.382879 \times 10^{-8}$ |

Displacement and tilt (1)

| | | | | | |
|---|---|---|---|---|---|
| x | 0.000 | y | 0.000 | z | 0.000 |
| α | 135.00 | β | 0.00 | γ | 0.00 |

Displacement and tilt (2)

| | | | | | |
|---|---|---|---|---|---|
| x | 0.000 | y | 0.000 | z | 0.000 |
| α | −45.00 | β | 0.00 | γ | 0.00 |

Displacement and tilt (3)

| | | | | | |
|---|---|---|---|---|---|
| x | 0.000 | y | 0.000 | z | 0.000 |
| α | 0.00 | β | 45.00 | γ | 0.00 |

Zooming Spaces

| | Wide-end | Standard position | Telephoto-end |
|---|---|---|---|
| $d_1$ | 5.20000 | 2.91230 | 0.50000 |
| $d_2$ | 0.20000 | 1.07610 | 3.24184 |
| $d_3$ | 0.80000 | 2.21160 | 2.45816 |
| $f_1/f_w$ = | −0.459 | | |
| $d_{z2}/d_{z1}$ = | −0.647 | | |

8th surface

| | |
|---|---|
| DY = | −0.048534 |
| Cxn = | 0.001736 |
| PXn/PX = | 0.181014 |
| PYn/PY = | 0.110186 |

9th surface

| | |
|---|---|
| DY = | −0.123494 |
| Cxn = | 0.002225 |

-continued

| | |
|---|---|
| PXn/PX = | 0.008871 |
| PYn/PY = | 0.051043 |

Example 5

| Surface No. | Radius of curvature | Surface separation | Displacement and tilt | Refractive index | Abbe's No. |
|---|---|---|---|---|---|
| Object plane | ∞ | 3000.0000 | | | |
| 1 | −7.21 | 0.80 | | 1.5842 | 30.5 |
| 2 | 10.14 (ASS1) | $d_1$ | | | |
| 3 | 5.24 (ASS2) | 2.00 | | 1.5254 | 55.8 |
| 4 | −45.46 | $d_2$ | | | |
| 5 | 14.68 (ASS3) | 1.60 | | 1.5254 | 55.8 |
| 6 | −8.78 | $d_3$ | | | |
| 7 | −14.36 (ASS4) | 4.62 | | 1.5254 | 55.8 |
| 8 | FFS [1] | −4.62 | (1) | 1.5254 | 55.8 |
| 9 | FFS [2] | 4.62 | (2) | 1.5254 | 55.8 |
| 10 | ∞ | 1.50 | | | |
| 11 | ∞ | 0.00 | | | |
| | (Intermediate image plane) | | | | |
| 12 | 9.45 | 5.79 | | 1.5254 | 55.8 |
| 13 | ∞ | −8.79 | (3) | 1.5254 | 55.8 |
| 14 | ∞ | 12.58 | (3) | 1.5254 | 55.8 |
| 15 | ∞ | 1.50 | | | |
| 16 | 10.91 (ASS5) | 2.62 | | 1.4924 | 57.6 |
| 17 | −79.29 | 18.50 | | | |
| 18 | ∞ | | | | |
| (Eyepoint) | | | | | |

| | | | FFS [1] | | |
|---|---|---|---|---|---|
| $C_5$ | $-2.3770 \times 10^{-3}$ | $C_7$ | $-3.1902 \times 10^{-3}$ | $C_8$ | $2.2752 \times 10^{-4}$ |
| $C_{10}$ | $4.0118 \times 10^{-5}$ | $C_{12}$ | $-3.3348 \times 10^{-5}$ | $C_{14}$ | $-1.7642 \times 10^{-4}$ |
| $C_{16}$ | $-1.1360 \times 10^{-5}$ | $C_{17}$ | $3.7297 \times 10^{-6}$ | | |
| | | | FFS [2] | | |
| $C_5$ | $9.7327 \times 10^{-4}$ | $C_7$ | $-2.3890 \times 10^{-3}$ | $C_8$ | $2.2095 \times 10^{-4}$ |
| $C_{10}$ | $-7.7803 \times 10^{-5}$ | $C_{12}$ | $-3.1397 \times 10^{-5}$ | $C_{14}$ | $1.2066 \times 10^{-4}$ |
| $C_{16}$ | $-1.4635 \times 10^{-4}$ | $C_{17}$ | $1.1908 \times 10^{-5}$ | | |
| | | | ASS1 | | |
| K | $9.5350 \times 10^{-1}$ | A | $-3.8896 \times 10^{-4}$ | B | $2.9938 \times 10^{-5}$ |
| | | C | $-2.6144 \times 10^{-5}$ | D | $2.1315 \times 10^{-6}$ |
| | | | ASS2 | | |
| K | $-6.3999 \times 10^{-1}$ | A | $1.8291 \times 10^{-4}$ | B | $1.1997 \times 10^{-4}$ |
| | | C | $-2.1612 \times 10^{-5}$ | D | $9.5866 \times 10^{-7}$ |
| | | | ASS3 | | |
| K | $-1.3708 \times 10$ | A | $-1.4033 \times 10^{-3}$ | B | $-1.3244 \times 10^{-4}$ |
| | | C | $8.8081 \times 10^{-6}$ | D | $-2.1819 \times 10^{-7}$ |
| | | | ASS4 | | |
| K | $2.4602 \times 10$ | A | $6.9178 \times 10^{-4}$ | B | $2.8044 \times 10^{-4}$ |
| | | C | $-6.3141 \times 10^{-5}$ | D | $7.4779 \times 10^{-6}$ |
| | | | ASS5 | | |
| K | $8.7308 \times 10^{-2}$ | A | $-2.0870 \times 10^{-4}$ | B | $5.3399 \times 10^{-6}$ |
| | | C | $-2.5127 \times 10^{-7}$ | D | $3.7542 \times 10^{-9}$ |
| | | Displacement and tilt (1) | | | |
| x | 0.00 | y | 0.00 | z | 0.00 |
| α | 135.00 | β | 0.00 | γ | 0.00 |
| | | Displacement and tilt (2) | | | |
| x | 0.00 | y | 0.00 | z | 0.00 |
| α | −45.00 | β | 0.00 | γ | 0.00 |
| | | Displacement and tilt (3) | | | |
| x | 0.00 | y | 0.00 | z | 0.00 |
| α | 0.00 | β | 45.00 | γ | 0.00 |

Zooming Spaces

| | Wide-end | Standard position | Telephoto-end |
|---|---|---|---|
| $d_1$ | 4.90000 | 2.47329 | 0.70000 |
| $d_2$ | 0.20000 | 0.36713 | 0.20000 |
| $d_3$ | 0.50000 | 2.11811 | 4.70000 |
| $f_1/f_w =$ | −1.459 | | |
| $d_{z2}/d_{z1} =$ | 0 | | |

-continued

8th surface

DY = -0.006003
Cxn = 0.000289
PXn/PX = 0.148615
PYn/PY = 0.107046

9th surface

DY = 0.018873
Cxn = -0.000572
PXn/PX = 0.111291
PYn/PY = 0.043830

Figure 7:
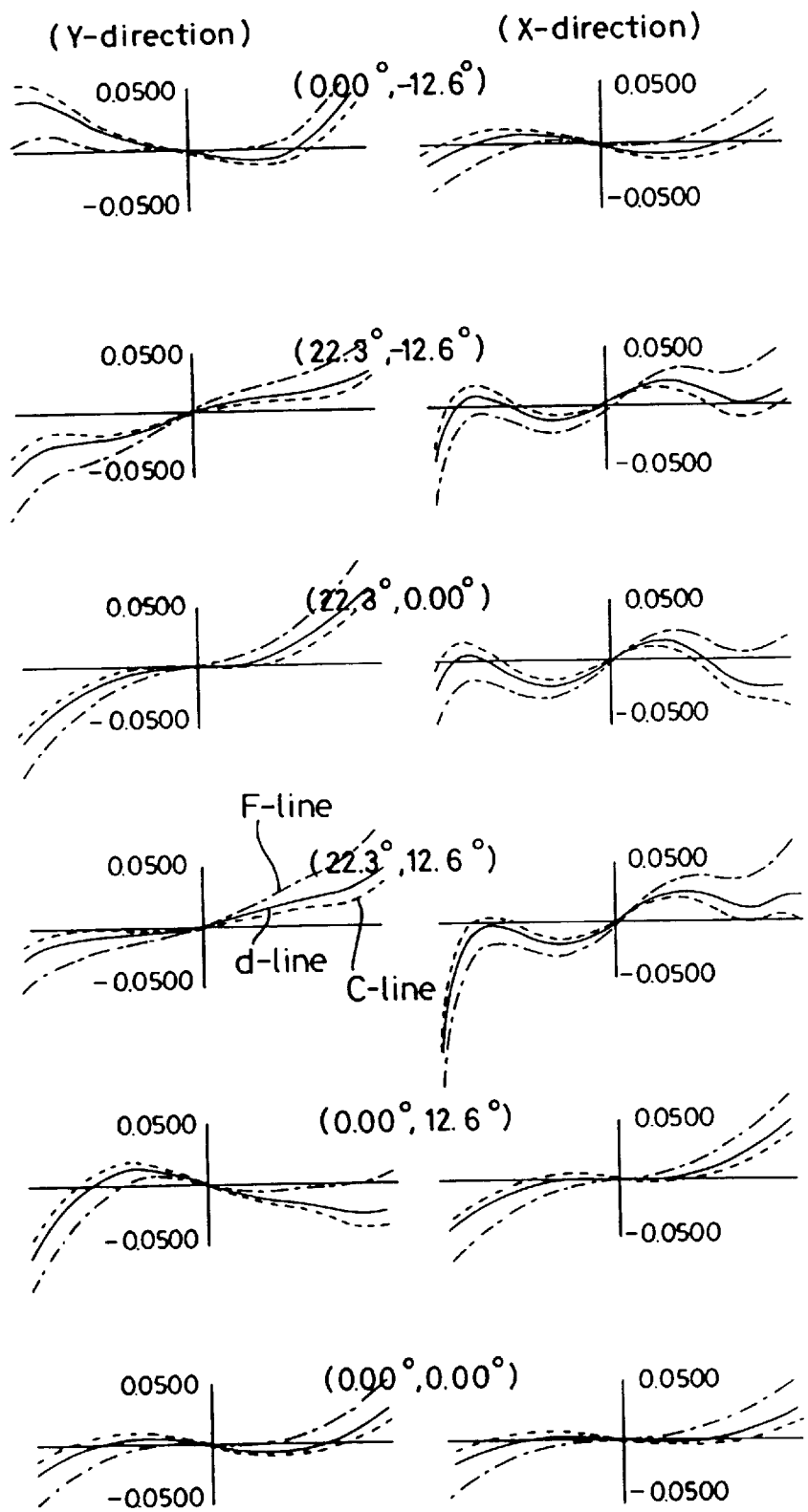
FIG. 7 is an aberrational diagram illustrating lateral aberration produced at the wide-angle end in Example 1.
Figure 8:
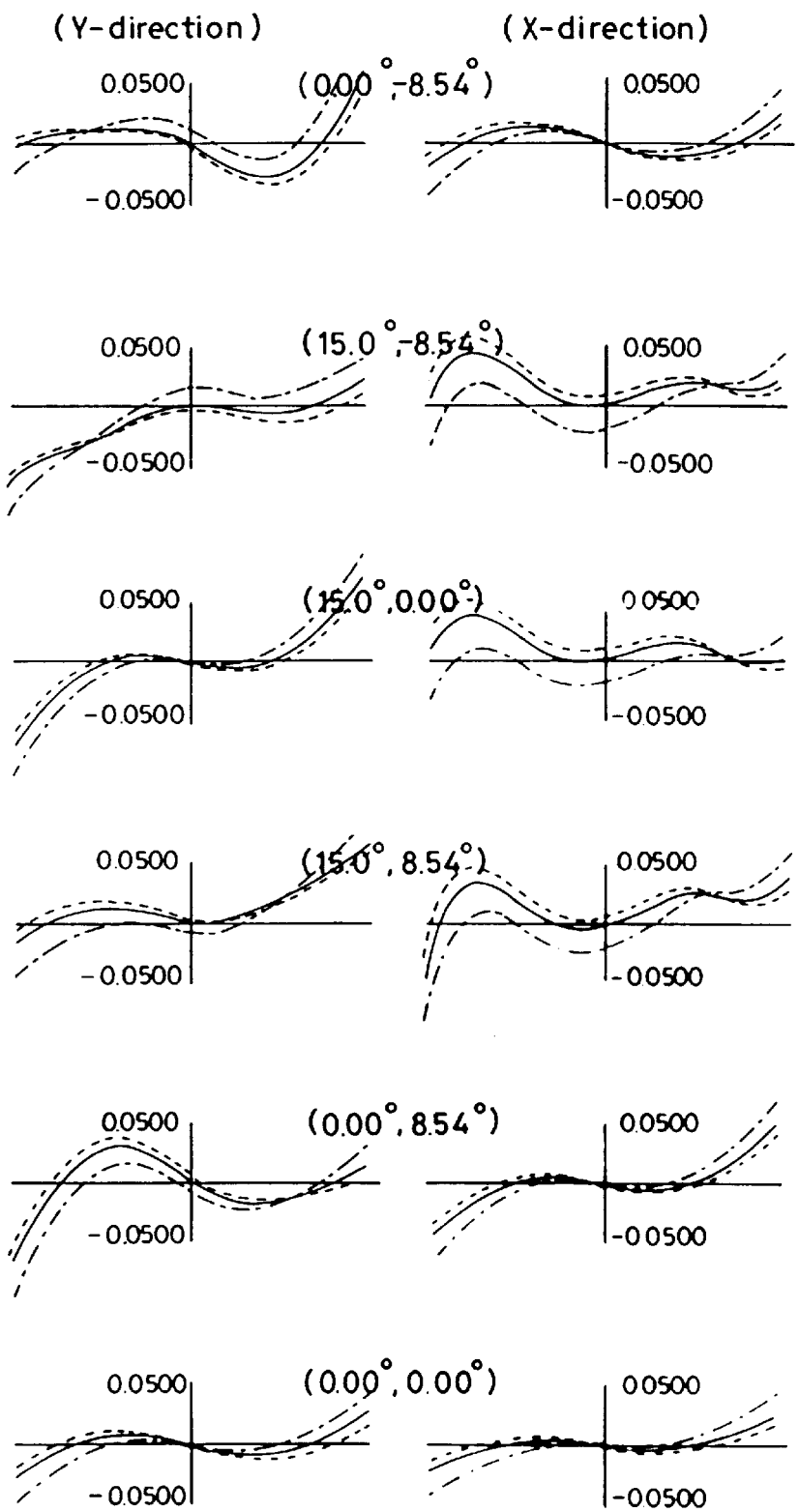
FIG. 8 is an aberrational diagram illustrating lateral aberration produced at the standard position in Example 1.
Figure 9:
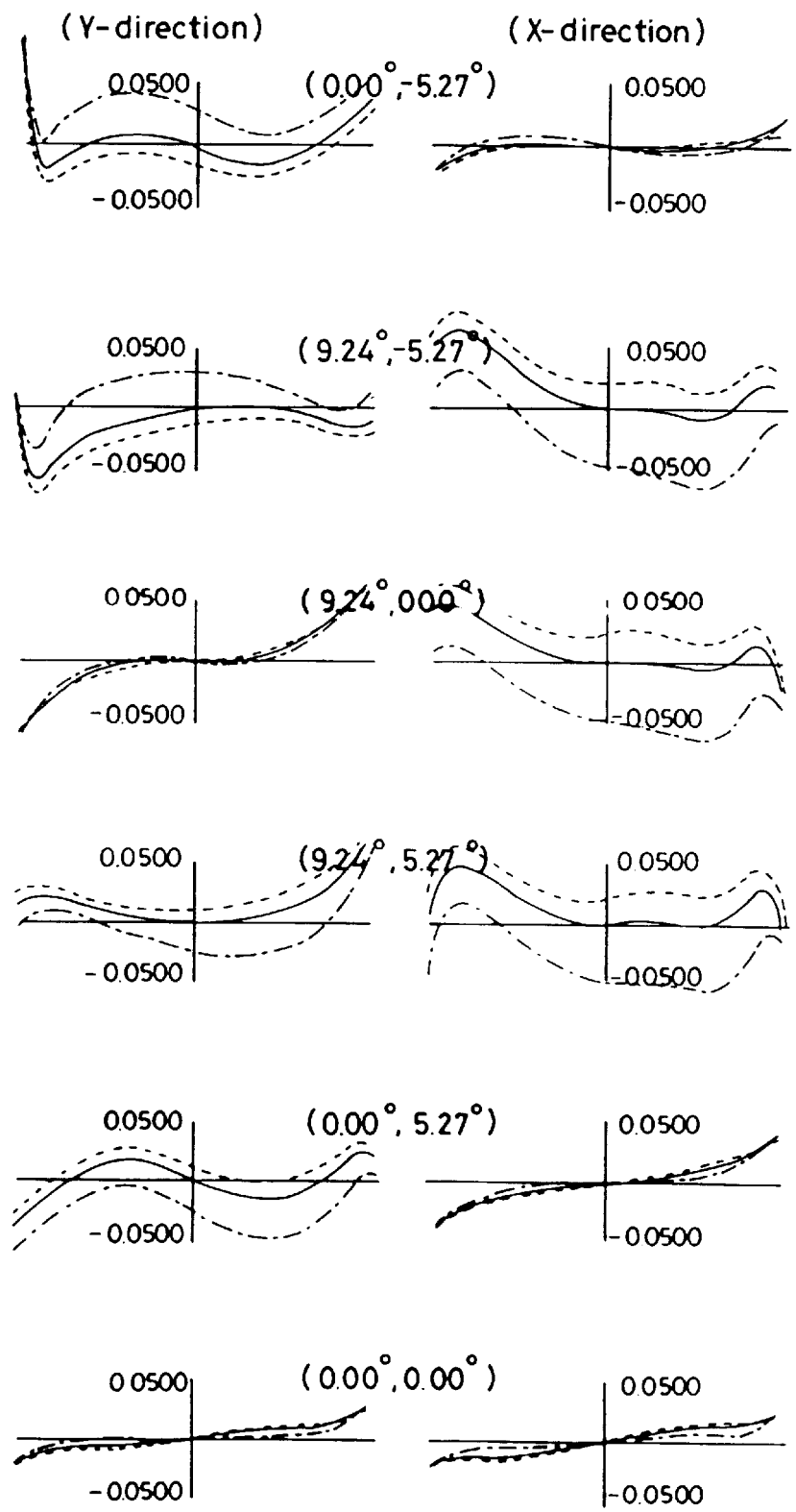
FIG. 9 is an aberrational diagram illustrating lateral aberration produced at the telephoto end in Example 1.

FIGS. 7 to 9 graphically show lateral aberrations in the center and at the maximum field angles in the directions X and Y in the above-described Example 1 at the wide-angle end, standard position and telephoto end, respectively. In these diagrams showing lateral aberrations, the parenthesized numerals denote [horizontal (X-direction) field angle, vertical (Y-direction) field angle], and lateral aberrations at the field angles are shown. It should, however, be noted that the lateral aberrations are those on the image-formation plane of a stigmatic image-forming lens placed on the observation side of the ocular optical system Oc.

Figure 10A:
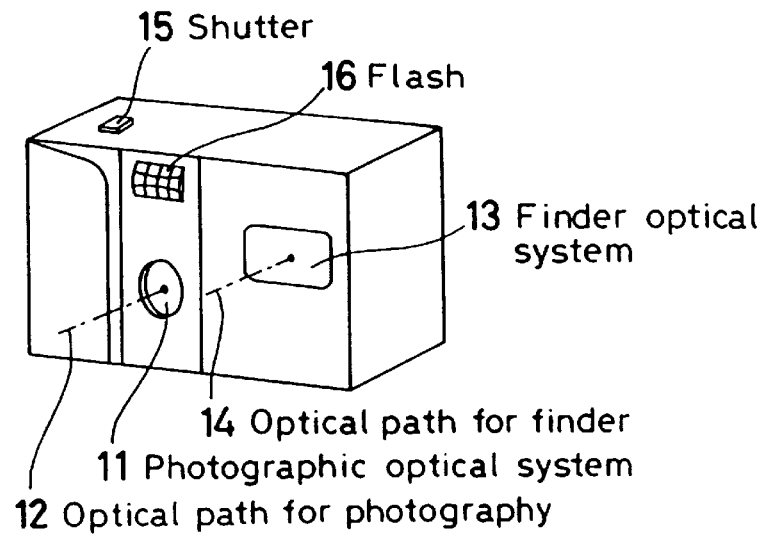
FIG. 10(a), 10(b), and 10(c) is a diagram for explaining one example of an electronic camera using a real-image finder according to the present invention.
Figure 10B:
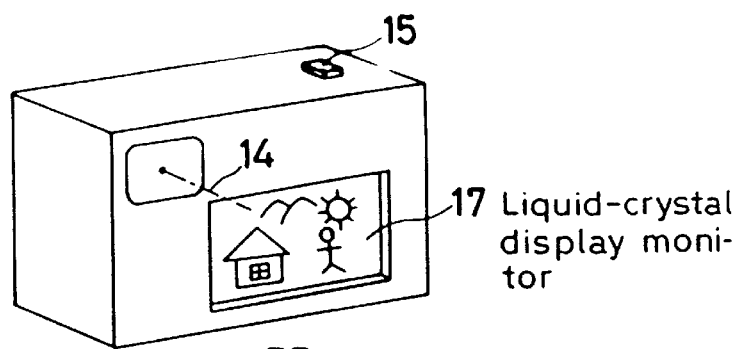
Figure 10C:
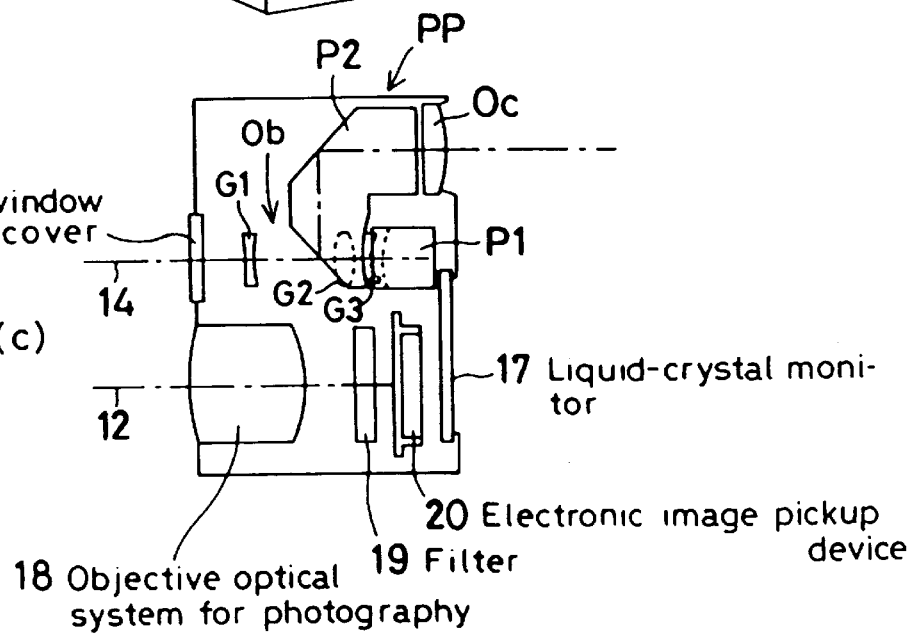
Figure 11:
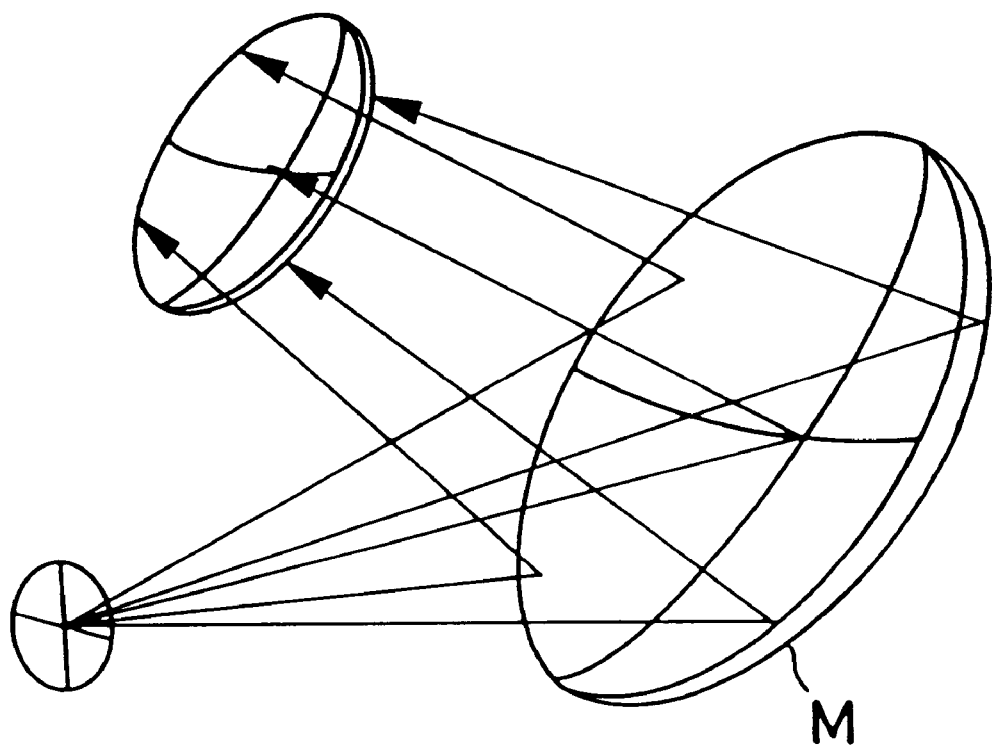
FIG. 11 is a conceptual view for explaining curvature of field produced by a decentered reflecting surface.
Figure 12:
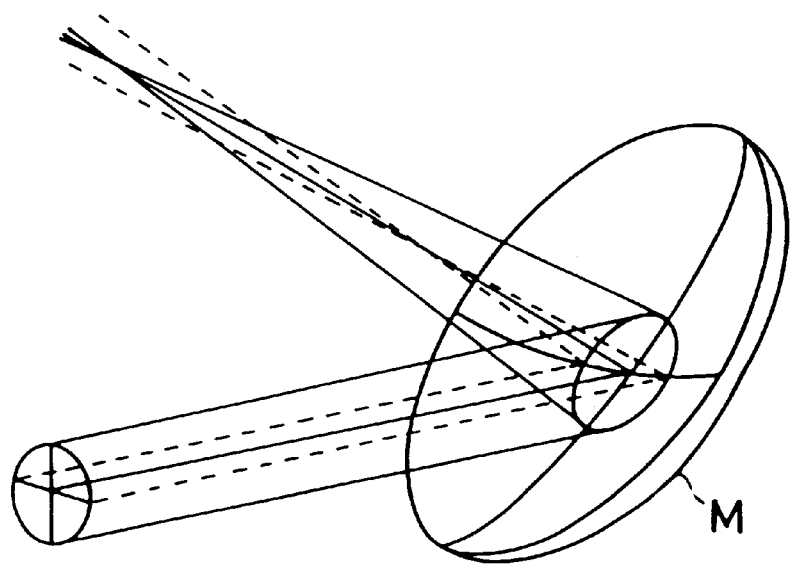
FIG. 12 is a conceptual view for explaining astigmatism produced by a decentered reflecting surface.
Figure 13:
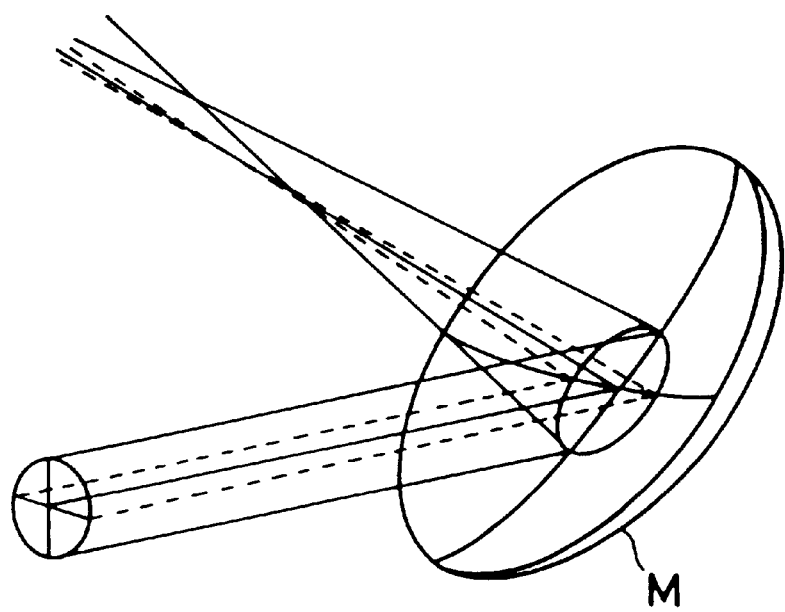
FIG. 13 is a conceptual view for explaining coma produced by a decentered reflecting surface.
Figure 14A:
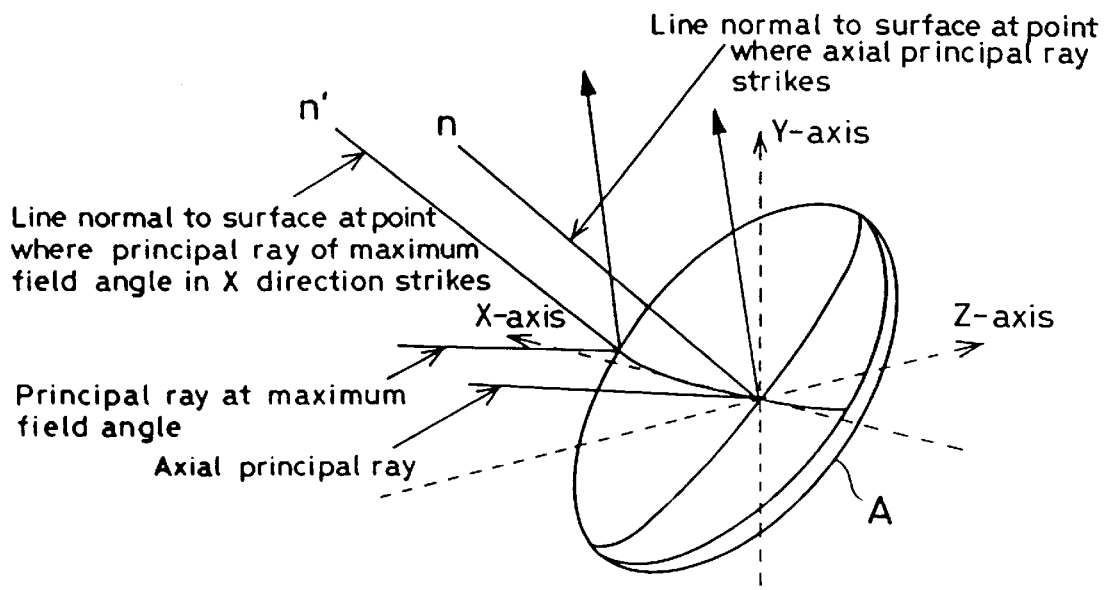
FIG. 14(a) and 14(b) is a diagram for explaining parameter DY used in the present invention.
Figure 14B:
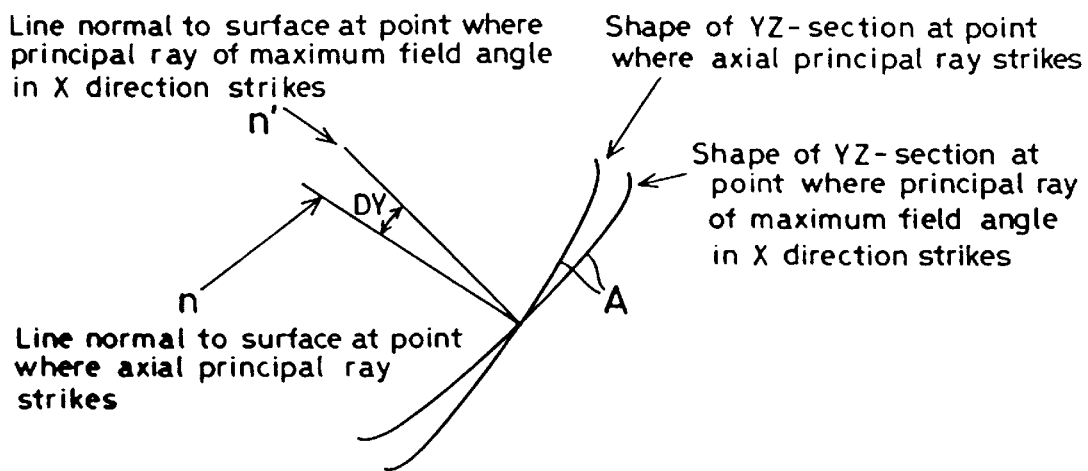

The above-described real-image finder optical system according to the present invention can be used as a finder optical system 13 of an electronic camera as shown for example in FIG. 10. In FIG. 10, part (a) is a perspective view of the electronic camera as viewed from the front thereof; part (b) is a perspective view of the electronic camera as viewed from the rear thereof; and part (c) is a ray path diagram showing an optical system of the electronic camera. The electronic camera includes a photographic optical system 11 having an optical path 12 for photography; a finder optical system 13 having an optical path 14 for a finder; a shutter 15; a flash 16; and a liquid-crystal display monitor 17. The finder optical system 13 includes an objective optical system Ob, an image-inverting optical system PP, and an ocular optical system Oc, as in Example 1 shown in FIG. 1, for example. The finder optical system 13 is of the type which enables the visual field to be viewed directly. It should be noted that a transparent finder window cover 21 is placed on the entrance side of the objective optical system Ob in the finder optical system 13.

The photographic optical system 11 includes an objective optical system 18 for photography, a filter 19, e.g. an infrared cutoff filter, and an electronic image pickup device 20 placed in the image-formation plane of the objective optical system 18. A subject image taken by the electronic image pickup device 20 or an image recorded in a recording device is displayed on the liquid-crystal display monitor 17.

The real-image finder according to the present invention can be used as a finder optical system of a compact camera for photography in which a photographic film is disposed in place of the electronic image pickup device 20 to take a picture of a subject.

As will be clear from the foregoing description, the present invention makes it possible to obtain a high-performance real-image finder in which a power is given to a reflecting surface of an image-inverting optical system to reduce the size in the direction of the thickness, and at the same time, a rotationally asymmetric surface is used in the image-inverting optical system to correct rotationally asymmetric decentration aberrations.

What we claim is:

1. A real-image finder comprising, in order from an object side thereof:

an objective optical system having a positive refracting power;

an image-inverting optical system having a reflecting surface, said image-inverting optical system erecting an intermediate image formed by said objective optical system; and an ocular optical system having a positive refracting power;

wherein said objective optical system includes, in order from an object side thereof, a first lens unit having a negative refracting power, a second lens unit having a positive refracting power, and a third lens unit having one of a positive refracting power and a negative refracting power, wherein when zooming from a wide-angle end to a telephoto end is performed, a spacing between each pair of lens units among said first, second and third lens units is changed, and wherein said reflecting surface of said image-inverting optical system is arranged in a form of a curved reflecting mirror having an optical power and having a rotationally asymmetric surface configuration that corrects decentration aberrations produced by said curved reflecting mirror.

2. A real-image finder according to claim 1, wherein said third lens unit has a negative refracting power.

3. A real-image finder according to claim 1, wherein said third lens unit has a positive refracting power.

4. A real-image finder according to claim 1, which satisfies at least one of the following conditions:

$$-2.0 < f_1/f_W < 0 \qquad (1\text{-}1)$$

$$-2.0 < d_{z2}/d_{z1} < 1 \qquad (1\text{-}2)$$

where $f_1$ is a focal length of the first lens unit of said objective optical system; $f_W$ is a focal length of said objective optical system (exclusive of a focal length corresponding to the power of said image-inverting optical system) at the wide-angle end; $d_{z1}$ is an amount of change in a spacing between the first lens unit and the second lens unit during zooming from the wide-angle end to the telephoto end; and $d_{z2}$ is an amount of change in a spacing between the second lens unit and the third lens unit during zooming from the wide-angle end to the telephoto end.

5. A real-image finder according to claim 1, wherein a light ray passing through a center of an object point and passing through a center of a stop or aperture of said objective optical system to reach a center of an intermediate image plane and further passing through said ocular optical system to enter a center of a pupil is defined as an axial principal ray, an axis defined by a straight line along which said axial principal ray travels until it intersects said rotationally asymmetric surface is defined as a Z-axis, an axis perpendicularly intersecting said Z-axis in a decentration plane of said rotationally asymmetric surface is defined as a Y-axis, and an axis perpendicularly intersecting both said Z-axis and said Y-axis is defined as an X-axis, the following condition is satisfied:

$$|DY| < 0.5 \quad (3\text{-}1)$$

where DY denotes a difference between a value of a tangent in a YZ-plane of a line normal to said rotationally asymmetric surface at a point where a principal ray at a maximum field angle in an X-axis direction intersects said rotationally asymmetric surface at the wide-angle end and a value of a tangent in the plane of a line normal to said rotationally asymmetric surface at a point where said axial principal ray intersects said rotationally asymmetric surface at the wide-angle end.

6. A real-image finder according to claim 1, wherein a light ray passing through a center of an object point and passing through a center of a stop or aperture of said objective optical system to reach a center of an intermediate image plane and further passing through said ocular optical system to enter a center of a pupil is defined as an axial principal ray, an axis defined by a straight line along which said axial principal ray travels until it intersects said rotationally asymmetric surface is defined as a Z-axis, an axis perpendicularly intersecting said Z-axis in a decentration plane of said rotationally asymmetric surface is defined as a Y-axis, and an axis perpendicularly intersecting both said Z-axis and said Y-axis is defined as an X-axis, the following condition is satisfied:

$$|Cxn| < 1 \quad (4\text{-}1)$$

$$1 < |Cxn| < 10 \quad (4\text{-}2)$$

where Cxn denotes a ration between a curvature in an X-axis direction of a portion of said rotationally asymmetric surface at which a principal ray at a maximum field angle in a positive direction of the Y-axis impinges on said rotationally asymmetric surface at the wide-angle end and a curvature in the X-axis direction of a portion of said rotationally asymmetric surface at which a principal ray at a maximum field angle in a negative direction of the Y-axis impinges on said rotationally asymmetric surface at the wide-angle end.

7. A real-image finder according to claim 1, wherein a light ray passing through a center of an object point and passing through a center of a stop or aperture of said objective optical system to reach a center of an intermediate image plane and further passing through said ocular optical system to enter a center of a pupil is defined as an axial principal ray, an axis defined by a straight line along which said axial principal ray travels until it intersects said rotationally asymmetric surface is defined as a Z-axis, an axis perpendicularly intersecting said Z-axis in a decentration plane of said rotationally asymmetric surface is defined as a Y-axis, and an axis perpendicularly intersecting both said Z-axis and said Y-axis is defined as an X-axis, the following condition is satisfied:

$$0 < |PXn/PX| < 1 \quad (5\text{-}1)$$

$$0 < |PYn/PY| < 1 \quad (5\text{-}2)$$

where PX, PY, PXn and PYn are defined such that at the wide-angle end, light rays having a small height d relative to X- and Y-axis directions, respectively, are passed through a first surface of said objective optical system substantially parallel to said axial principal ray, and that a sine of a tilt angle with respect to said axial principal ray of each of said rays when emanating from a surface closest to the intermediate image among surfaces participating in formation of said intermediate image is divided by said d, and values thus obtained are denoted by PX and PY, respectively, and further that powers in the X- and Y-axis directions of said rotationally asymmetric surface near said axial principal ray are denoted by PXn and PYn, respectively.

8. A real-image finder comprising, in order from an object side thereof:

an objective optical system having a positive refracting power;

an image-inverting optical system having a reflecting surface, said image inverting-optical system erecting an intermediate image formed by said objective optical system; and an ocular optical system having a positive refracting power;

wherein said objective optical system includes, in order from an object side thereof, a first lens unit having a negative refracting power, a second lens unit having a positive refracting power, and a third lens unit having a negative refracting power, wherein zooming is performed by changing a spacing between each pair of lens units among said first, second and third lens units, and wherein said reflecting surface of said image-inverting optical system has an optical power, and at least one surface of said image-inverting optical system has a rotationally asymmetric surface configuration.

9. A real-image finder according to claim 8, wherein said at least one surface having a rotationally asymmetric surface configuration is decentered with respect to an axial principal ray.

10. A real-image finder according to claim 9, wherein said rotationally asymmetric surface configuration has no axis of rotational symmetry.

11. A real-image finder according to claim 10, wherein said image-inverting optical system includes a Porro prism.

12. A real-image finder according to claim 8, which satisfies at least one of the following conditions:

$$-2.0 < f_1/f_W < 0 \quad (2\text{-}1)$$

$$-2.0 < d_{z2}/d_{z1} < 0 \quad (2\text{-}2)$$

where $f_1$ is a focal length of the first lens unit of said objective optical system; $f_W$ is a focal length of said objective optical system (exclusive of a focal length corresponding to the power of said image-inverting optical system) at the wide-angle end; $d_{z1}$ is an amount of change in a spacing between the first lens unit and the second lens unit during zooming from the wide-angle end to the telephoto end; and $d_{z2}$ is an amount of change in a spacing between the second lens unit and the third lens unit during zooming from the wide-angle end to the telephoto end.

13. A real-image finder comprising, in order from an object side thereof:

an objective optical system having a positive refracting power;

an image-inverting optical system having a reflecting surface, said image-inverting optical system erecting an intermediate image formed by said objective optical system; and an ocular optical system having a positive refracting power;

wherein said objective optical system includes, in order from an object side thereof, a first lens unit having a negative refracting power, a second lens unit having a positive refracting power, and a third lens unit having a positive refracting power, wherein zooming is performed by changing a spacing between each pair of lens units among said first, second and third lens units, and wherein said reflecting surface of said image-inverting optical system has an optical power, and at least one surface of said image-inverting optical system has a rotationally asymmetric surface configuration.

14. A real-image finder according to claim 13, wherein said at least one surface having a rotationally asymmetric surface configuration is decentered with respect to an axial principal ray.

15. A real-image finder according to claim 14, wherein said rotationally asymmetric surface configuration has no axis of rotational symmetry.

16. A real-image finder according to claim 15, wherein said image-inverting optical system includes a Porro prism.

17. A real-image finder according to claim 13, which satisfies at least one of the following conditions:

$$-2.0 < f_1/f_W < 0 \quad (2\text{-}1)$$

$$-2.0 < d_{z2}/d_{z1} < 0 \quad (2\text{-}2)$$

where $f_1$ is a focal length of the first lens unit of said objective optical system; $f_W$ is a focal length of said objective optical system (exclusive of a focal length corresponding to the power of said image-inverting optical system) at the wide-angle end; $d_{z1}$ is an amount of change in a spacing between the first lens unit and the second lens unit during zooming from the wide-angle end to the telephoto end; and $d_{z2}$ is an amount of change in a spacing between the second lens unit and the third lens unit during zooming from the wide-angle end to the telephoto end.

18. A camera comprising a real-image finder according to claim 17.

19. A camera according to claim 18 further comprising an objective optical system for photography.

20. A camera according to claim 19, further comprising:

an electronic image pickup device placed in an image plane formed by said objective optical system for photography, and a liquid-crystal monitor provided on a back of said camera, said liquid-crystal monitor displaying an image received by said electronic image pickup device as an image for observation.

21. A camera comprising a real-image finder according to any one of claims 1 to 7.

22. A camera comprising a real-image finder according to any one of claims 1 to 7; and an objective optical system for photography.

23. A camera according to claim 22, further comprising:

an electronic image pickup device placed in an image plane formed by said objective optical system for photography; and a liquid-crystal monitor provided on a back of said camera, said liquid-crystal monitor displaying an image received by said electronic image pickup device as an image for observation.

* * * * *